United States Patent
Kim et al.

(10) Patent No.: US 10,834,745 B2
(45) Date of Patent: Nov. 10, 2020

(54) UPLINK TRANSMISSION METHOD AND APPARATUS USING EXTENDED UPLINK SUBFRAME

(71) Applicant: ELECTRONICS AND TELECOMMUNICATIONS RESEARCH INSTITUTE, Daejeon (KR)

(72) Inventors: Cheulsoon Kim, Daejeon (KR); Sung-Hyun Moon, Daejeon (KR); Ji Hyung Kim, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 166 days.

(21) Appl. No.: 16/084,400

(22) PCT Filed: Apr. 5, 2017

(86) PCT No.: PCT/KR2017/003716
§ 371 (c)(1),
(2) Date: Sep. 12, 2018

(87) PCT Pub. No.: WO2017/176044
PCT Pub. Date: Oct. 12, 2017

(65) Prior Publication Data
US 2019/0075582 A1    Mar. 7, 2019

(30) Foreign Application Priority Data

Apr. 5, 2016  (KR) .................. 10-2016-0041940
Aug. 12, 2016 (KR) .................. 10-2016-0103035
(Continued)

(51) Int. Cl.
*H04W 72/12*     (2009.01)
*H04L 5/00*      (2006.01)
(Continued)

(52) U.S. Cl.
CPC ....... *H04W 72/1268* (2013.01); *H04L 1/0068* (2013.01); *H04L 1/1607* (2013.01);
(Continued)

(58) Field of Classification Search
None
See application file for complete search history.

(56) References Cited

U.S. PATENT DOCUMENTS 9,686,788 B2    6/2017  Chen et al.
2011/0081902 A1 4/2011  Seo et al.
(Continued)

FOREIGN PATENT DOCUMENTS

KR  10-2015-0013458 A  2/2015
KR  10-2015-0040947 A  4/2015

OTHER PUBLICATIONS

ZTE, "Uplink DM RS design for NB-IoT", 3GPP TSG RAN WG1 Meeting #84, R1-160477, Feb. 2016.
(Continued)

*Primary Examiner* — Edan Orgad
*Assistant Examiner* — Emmanuel K Maglo
(74) *Attorney, Agent, or Firm* — LRK Patent Law Firm

(57) ABSTRACT

In an uplink transmission method of a first communication node, the first communication node receives a reference signal configuration for an UpPTS (uplink pilot time slot) from a second communication node when the UpPTS of a special subframe and a first uplink (UL) subframe are aggregated as an extended UL subframe. Also, the first communication node allocates a reference signal to the first UL subframe of the UpPTS and the first UL subframe based
(Continued)

on the reference signal configuration when a number of time domain symbols belonging to the UpPTS is a predetermined number or less.

9 Claims, 36 Drawing Sheets

(30) Foreign Application Priority Data

| | | |
|---|---|---|
| Sep. 30, 2016 | (KR) | 10-2016-0126985 |
| Nov. 7, 2016 | (KR) | 10-2016-0147312 |
| Dec. 7, 2016 | (KR) | 10-2016-0166029 |
| Apr. 4, 2017 | (KR) | 10-2017-0043863 |

(51) Int. Cl.

| | |
|---|---|
| *H04W 72/14* | (2009.01) |
| *H04W 52/16* | (2009.01) |
| *H04L 1/18* | (2006.01) |
| *H04L 1/00* | (2006.01) |
| *H04L 1/16* | (2006.01) |
| *H04L 27/26* | (2006.01) |
| *H04W 72/04* | (2009.01) |
| *H04L 5/14* | (2006.01) |
| *H04W 52/14* | (2009.01) |

(52) U.S. Cl.
CPC .......... *H04L 1/1854* (2013.01); *H04L 5/0048* (2013.01); *H04L 5/0051* (2013.01); *H04L 5/0053* (2013.01); *H04L 5/0055* (2013.01); *H04L 5/0064* (2013.01); *H04L 27/2605* (2013.01); *H04L 27/2613* (2013.01); *H04W 72/0446* (2013.01); *H04W 72/12* (2013.01); *H04W 72/14* (2013.01); *H04L 5/001* (2013.01); *H04L 5/1469* (2013.01); *H04W 52/146* (2013.01); *H04W 52/16* (2013.01)

(56) References Cited

U.S. PATENT DOCUMENTS

| | | | | |
|---|---|---|---|---|
| 2012/0307689 A1* | 12/2012 | Kim | ............ | H04L 41/08 370/280 |
| 2012/0320806 A1* | 12/2012 | Ji | ............ | H04W 72/042 370/280 |
| 2012/0329400 A1* | 12/2012 | Seo | ............ | H04L 5/005 455/63.1 |
| 2013/0259011 A1* | 10/2013 | Nakashima | ........ | H04W 52/146 370/336 |
| 2013/0343356 A1 | 12/2013 | Bai et al. | | |
| 2014/0029516 A1* | 1/2014 | Heo | ............ | H04W 24/02 370/328 |
| 2014/0086112 A1* | 3/2014 | Stern-Berkowitz | ........ | H04L 1/1822 370/280 |
| 2014/0198773 A1 | 7/2014 | Yin et al. | | |
| 2015/0078222 A1* | 3/2015 | Yang | ............ | H04L 5/0092 370/280 |
| 2015/0085840 A1* | 3/2015 | Liu | ............ | H04L 1/1887 370/336 |
| 2015/0092637 A1 | 4/2015 | Yang et al. | | |
| 2015/0201431 A1 | 7/2015 | Um et al. | | |
| 2015/0237626 A1* | 8/2015 | Li | ............ | H04L 5/14 370/280 |
| 2015/0319718 A1* | 11/2015 | Yang | ............ | H04W 72/0406 370/252 |
| 2015/0334762 A1* | 11/2015 | Yang | ............ | H04W 76/15 370/329 |
| 2016/0014802 A1* | 1/2016 | Yang | ............ | H04W 72/1215 370/329 |
| 2016/0112178 A1* | 4/2016 | Yi | ............ | H04L 5/0007 370/280 |
| 2017/0302419 A1* | 10/2017 | Liu | ............ | H04L 5/0078 |
| 2017/0317790 A1* | 11/2017 | Yao | ............ | H04L 5/0051 |
| 2018/0006787 A1* | 1/2018 | Chen | ............ | H04L 5/0051 |

OTHER PUBLICATIONS

Nokia Networks et al., "On UL DMRS design for NB-IoT", 3GPP TSG RAN WG1 Meeting #84, R1-160455, Feb. 2016.
ETRI, "Design considerations for UL control channel", 3GPP TSG RAN WG1 Meeting #87, R1-1612221, Reno, USA Nov. 14-18, 2016.
ETRI, "Multiplexing eMBB and URLLC UL control channels", 3GPP TSG RAN WG1 NR Ad Hoc Meeting, R1-1700583, Spokane, USA Jan. 16-20, 2017.
ETRI, "Multiplexing eMBB and URLLC UL control channels", 3GPP TSG RAN WG1 NR Ad Hoc Meeting, R1-1702351, Athens, Greece Feb. 13-17, 2017.
"3rd Generation Partnership Project; Technical Specification Group Radio Access Network; Evolved Universal Terrestrial Radio Access (E-UTRA); Physical layer procedures", (Release 14) 3GPP TS 36.213 V14.1.0 (Dec. 2016).
Ericsson, "Introduction of Uplink Capacity Enhancements for LTE", 3GPP TSG-RAN WG1 Meeting #88, R1-1703621, Athens Greece, Feb. 13-17, 2016.
Search Report for International Application No. PCT/KR2017/003716, dated Jul. 11, 2017, which corresponds to the above-identified application.
Written Opinion for International Application No. PCT/KR2017/003716, dated Jul. 11, 2017, which corresponds to the above-identified application.

* cited by examiner

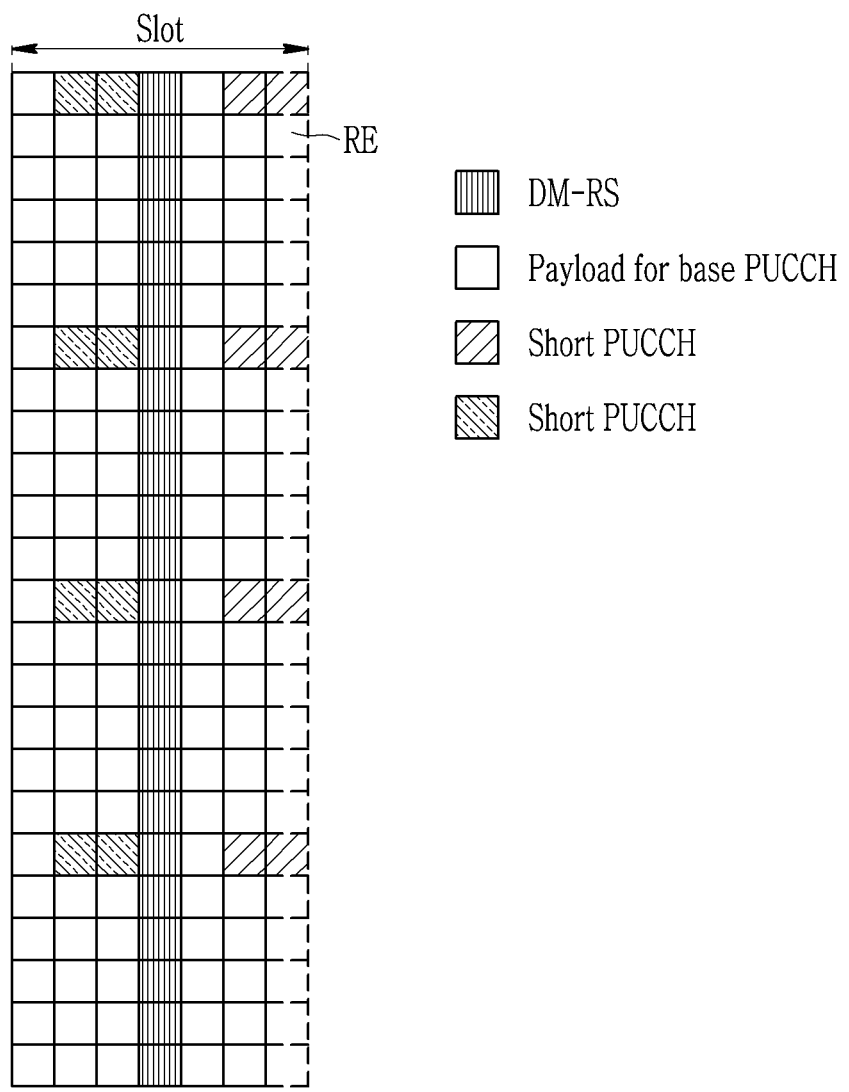

ated when a number of time domain symbols belonging to the UpPTS is a predetermined number or less.

The predetermined number may be three.

The reference signal may be a DM (demodulation)-RS (reference signal).

The allocation of the reference signal to the first UL subframe may include allocating the reference signal to each of a first slot and a second slot belonging to the first UL subframe.

The uplink transmission method may further include allocating the reference signal to the UpPTS and the first UL subframe based on the reference signal configuration when the number of the time domain symbols belonging to the UpPTS is larger than the predetermined number.

The allocation of the reference signal to the UpPTS and the first UL subframe may include allocating the reference signal to a fourth from a last time domain symbol among the time domain symbols belonging to the UpPTS.

The first UL subframe may include a first slot and a second slot next to the first slot.

An OCC (orthogonal cover code) or a cyclic shift for the reference signal allocated to the UpPTS may be the same as an OCC or a cyclic shift for the reference signal allocated to the second slot.

The same PUSCH (physical uplink shared channel) TPC (transmit power control) may be applied to the special subframe and the first UL subframe.

The uplink transmission method may further include receiving one UL grant for scheduling of the extended UL subframe from the second communication node.

One UL grant may be based on an index of the first UL subframe.

The uplink transmission method may further include transmitting a PUSCH (physical uplink shared channel) for a retransmission in the extended UL subframe of an (n+k) index when receiving a PHICH (physical hybrid automatic repeat and request indicator channel) from the second communication node in a downlink (DL) subframe of an n index.

An index of the first UL subframe may be (n+k), and an index of the special subframe may be (n+k−1).

The uplink transmission method may further include: transmitting a PUSCH (physical uplink shared channel) to the second communication node in the extended UL subframe of an (n−k) index; and receiving a PHICH (physical hybrid automatic repeat and request indicator channel) for the PUSCH from the second communication node in a downlink (DL) subframe of an n index.

An index of the first UL subframe may be (n−k), and an index of the special subframe may be (n−k−1).

According to another exemplary embodiment of the present invention, an uplink (UL) transmission method of a first communication node is provided. The uplink transmission method includes: transmitting a UL data channel to a second communication node in an extended UL subframe in which an UpPTS (uplink pilot time slot) of a special subframe and a first UL subframe are aggregated; and receiving a response channel for the UL data channel from the second communication node in a first downlink (DL) subframe.

An index of the extended UL subframe may be determined to be the same as an index of the first UL subframe.

Each index of the special subframe and the first UL subframe may be (n−k−1) and (n−k), and an index of the first DL subframe may be n.

The uplink transmission method may further include receiving a UL grant for the extended UL subframe from the second communication node in a second DL subframe.

UPLINK TRANSMISSION METHOD AND APPARATUS USING EXTENDED UPLINK SUBFRAME

CROSS-REFERENCE TO RELATED APPLICATIONS

The present application is a U.S. National Phase entry from International Application No. PCT/KR2017/003716, filed Apr. 5, 2017, which claims priority to Korean Patent Application Nos. 10-2016-0041940, filed Apr. 5, 2016, 10-2016-0103035, filed Aug. 12, 2016, 10-2016-0126985, filed Sep. 30, 2016, 10-2016-0147312, filed Nov. 7, 2016, 10-2016-0166029, filed Dec. 7, 2016, and 10-2017-0043863, filed Apr. 4, 2017, the disclosures of which are incorporated by reference herein in their entireties.

BACKGROUND OF THE INVENTION

1. Technical Field

The present invention relates to an uplink transmission method using an extended uplink subframe and an apparatus thereof, and a communication method using an extended uplink subframe and an apparatus thereof.

In detail, the present invention relates to a method and an apparatus for improving uplink transmission by using an LTE (long term evolution) mixed subframe.

2. Description of Related Art

In a next generation communication system, a MBB (mobile broadband) scenario and a URLLC (ultra-reliable low-latency communications) scenario are all considered.

To satisfy the URLLC scenario, a TDD (time division duplexing) radio frame has a shorter uplink (UL)-downlink (DL) switching period, thereby the UL transmission and the DL transmission are more often allocated and there is an effect of reducing a HARQ (hybrid automatic repeat and request) RTT (round trip time).

However, since a guard symbol for switching delay or a propagation delay must be allocated in the UL-DL switching period, a transmission amount or a throughput is reduced. Therefore, this is not preferable to the MBB scenario.

To satisfy both the MBB scenario and the URLLC scenario, a tradeoff between the switching period and the guard symbol must be appropriately considered.

SUMMARY OF THE INVENTION

The present invention provides a TDD radio frame in which the switching period is allocated every subframe and the guard symbol is allocated every two subframes.

Further, the present invention provides a method and an apparatus that increases the transmission amount of the LTE (long term evolution) uplink and decreases the transmission delay of the uplink.

According to an exemplary embodiment of the present invention, an uplink transmission method of a first communication node is provided. An uplink transmission method of a first communication node includes: receiving a reference signal configuration for an UpPTS (uplink pilot time slot) from a second communication node when the UpPTS of a special subframe and a first uplink (UL) subframe are aggregated as an extended UL subframe; and allocating a reference signal to the first UL subframe of the UpPTS and the first UL subframe based on the reference signal configu- An index of the second DL subframe may be determined based on an index of the first UL subframe.

The uplink transmission method may further include allocating a DM (demodulation)-RS (reference signal) to the UpPTS depending on a number of time domain symbols belonging to the UpPTS.

The allocation of the DM-RS to the UpPTS may include: allocating the DM-RS to the first UL subframe of the UpPTS and the first UL subframe when the number of time domain symbols belonging to the UpPTS is three or less; and allocating the DM-RS to the UpPTS and the first UL subframe when the number of time domain symbols belonging to the UpPTS is four or more.

According to another exemplary embodiment of the present invention, a communication method of an eNB (evolved node B) is provided. The communication method includes: determining a DM (demodulation)-RS (reference signal) configuration for an extended uplink (UL) subframe based on a number of time domain symbols belonging to an UpPTS (uplink pilot time slot) when the UpPTS of a special subframe and a first UL subframe are aggregated as the extended UL subframe; and transmitting the DM-RS configuration to a user equipment (UE).

The determination of the DM-RS configuration may include determining the DM-RS configuration such that the DM-RS is allocated to the first UL subframe of the UpPTS and the first UL subframe when the number of time domain symbols belonging to the UpPTS is a predetermined number or less.

The determination of the DM-RS configuration may include determining the DM-RS configuration such that the DM-RS is allocated to the UpPTS and the first UL subframe when the number of time domain symbols belonging to the UpPTS is larger than a predetermined number.

The communication method may include transmitting a UL grant for the extended UL subframe to the UE in a first downlink (DL) subframe.

An index of the extended UL subframe may be determined to be the same as an index of the first UL subframe, and an index of the first DL subframe may be determined based on the index of the first UL subframe.

The communication method may include: transmitting a PHICH (physical hybrid automatic repeat and request indicator channel) to the UE in a first downlink (DL) subframe; and receiving a PUSCH (physical uplink shared channel) for a retransmission from the UE in the extended UL subframe.

An index of the first DL subframe may be n, an index of the extended UL subframe may be (n+k), an index of the first UL subframe may be (n+k), and an index of the special subframe may be (n+k−1).

The communication method may include: receiving a PUSCH (physical uplink shared channel) from the UE in the extended UL subframe; and transmitting a PHICH (physical hybrid automatic repeat and request indicator channel) for the PUSCH to the UE in a first downlink (DL) subframe.

An index of the extended UL subframe may be (n−k), an index of the first DL subframe may be n, an index of the first UL subframe may be (n−k), and an index of the special subframe may be (n−k−1).

Advantageous Effects

According to an exemplary embodiment of the present invention, as the uplink data is allocated to the extended mixed subframe, a larger amount of uplink data may be transmitted in the mixed subframe.

BRIEF DESCRIPTION OF THE DRAWINGS

FIG. 12A and FIG. 12B are views showing a slot of an LTE PUCCH format 4 of a case that a normal CP is used according to an exemplary embodiment of the present invention.

DETAILED DESCRIPTION OF THE INVENTION

Figure 1A:
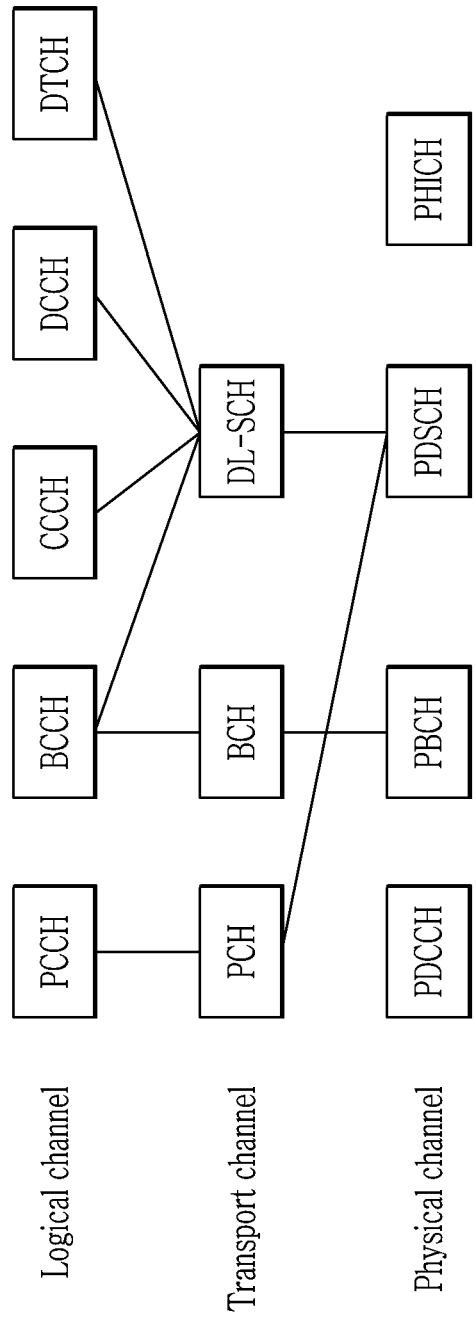
FIG. 1A and FIG. 1B are views showing channel mapping for a MBB scenario.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In this specification, redundant description of the same constituent elements is omitted.

Also, in this specification, it is to be understood that when one component is referred to as being "connected" or "coupled" to another component, it may be connected or coupled directly to another component or be connected or coupled to another component with the other component intervening therebetween. On the other hand, in this specification, it is to be understood that when one component is referred to as being "connected or coupled directly" to another component, it may be connected to or coupled to another component without the other component intervening therebetween.

It is also to be understood that the terminology used herein is only for the purpose of describing particular embodiments, and is not intended to be limiting of the invention.

Singular forms are to include plural forms unless the context clearly indicates otherwise.

It will be further understood that terms "comprises" or "have" used in the present specification specify the presence of stated features, numerals, steps, operations, components, parts, or a combination thereof, but do not preclude the presence or addition of one or more other features, numerals, steps, operations, components, parts, or a combination thereof.

Also, as used herein, the term "and/or" includes any plurality of combinations of items or any of a plurality of listed items. In this specification, 'A or B' may include 'A', 'B', or 'A and B'.

Also, in this specification, a user equipment (UE) may refer a terminal, a mobile terminal, a mobile station, an advanced mobile station, a high reliability mobile station, a subscriber station, a portable subscriber station, an access terminal, etc., or may include all or partial functions of the terminal, the mobile terminal, the mobile station, the advance mobile station, the high reliability mobile station, the subscriber station, the portable subscriber station, the access terminal, etc.

Also, in this specification, a evolved node B (eNB) may refer a nodeB (node B, NB), a gNB, a base station (BS), an advanced base station, a high reliability base station, an access point, a radio access station, a base transceiver station, an MMR (mobile multihop relay)-BS, a relay station performing a function of the base station, a high reliability relay station performing a function of the base station, a repeater, a macro base station, a small base station, etc., or may include all or partial functions of the nodeB, the gNB, the base station, the advanced base station, the HR-BS, the access point, the radio access station, the transceiver base station, the MMR-BS, the relay station, the high reliability relay station, the repeater, the macro base station, the small base station, etc.

For convenience of explanation, in this specification, an unpaired spectrum is considered, and carrier aggregation and half duplex communication are not considered. However, this is merely an example, and the present invention may be extended to the carrier aggregation and the half duplex communication based on the contents described in this specification.

Figure 1B:
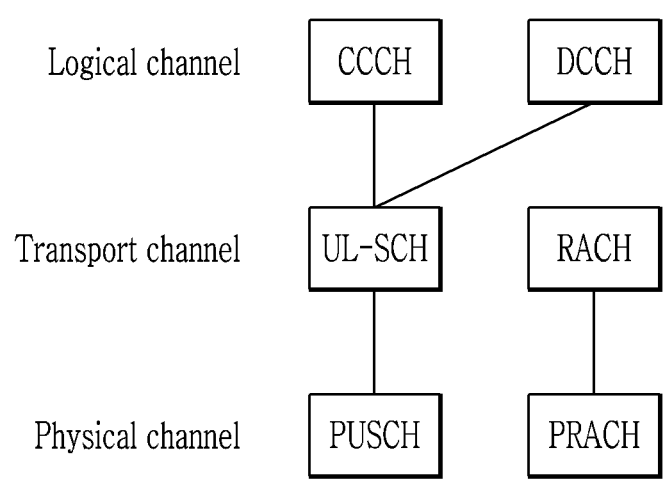

FIG. 1A and FIG. 1B are views showing channel mapping for an MBB scenario.

In detail, FIG. 1A illustrates downlink channel mapping and FIG. 1B illustrates uplink channel mapping.

In FIG. 1A, a PCCH (paging control channel), a BCCH (broadcast control channel), a CCCH (common control channel), a DCCH (dedicated control channel), and a DTCH (dedicated traffic channel) are logical channels, a PCH (paging channel), a BCH (broadcast channel), and a DL-SCH (shared channel) are transport channels, and a PDCCH (physical downlink control channel), a PBCH (physical broadcast channel), a PDSCH (physical downlink shared channel), and a PHICH (physical HARQ indicator channel) are physical channels.

As illustrated in FIG. 1A, the PCCH of the logical channel is mapped to the PCH of the transport channel, and the PCH is mapped to the PDSCH of the physical channel. The BCCH of the logical channel is mapped to the BCH or the DL-SCH of the transport channel, and the BCH is mapped the PBCH of the physical channel. The CCCH, the DCCH, or the DTCH of the logical channel is mapped to the DL-SCH of the transport channel, and the DL-SCH is mapped to the PDSCH of the physical channel.

In FIG. 1B, the CCCH and the DCCH are the logical channels, the UL-SCH and the RACH (random access channel) are the transport channels, and the PUSCH (physical uplink shared channel) and the PRACH (physical random access channel) are the physical channels.

As illustrated in FIG. 1B, the CCCH or the DCCH of the logical channel of the transport channel is mapped to the UL-SCH, and the UL-SCH is mapped to the PUSCH of the physical channel. The RACH of the transport channel is mapped to the PRACH of the physical channel.

Figure 2:
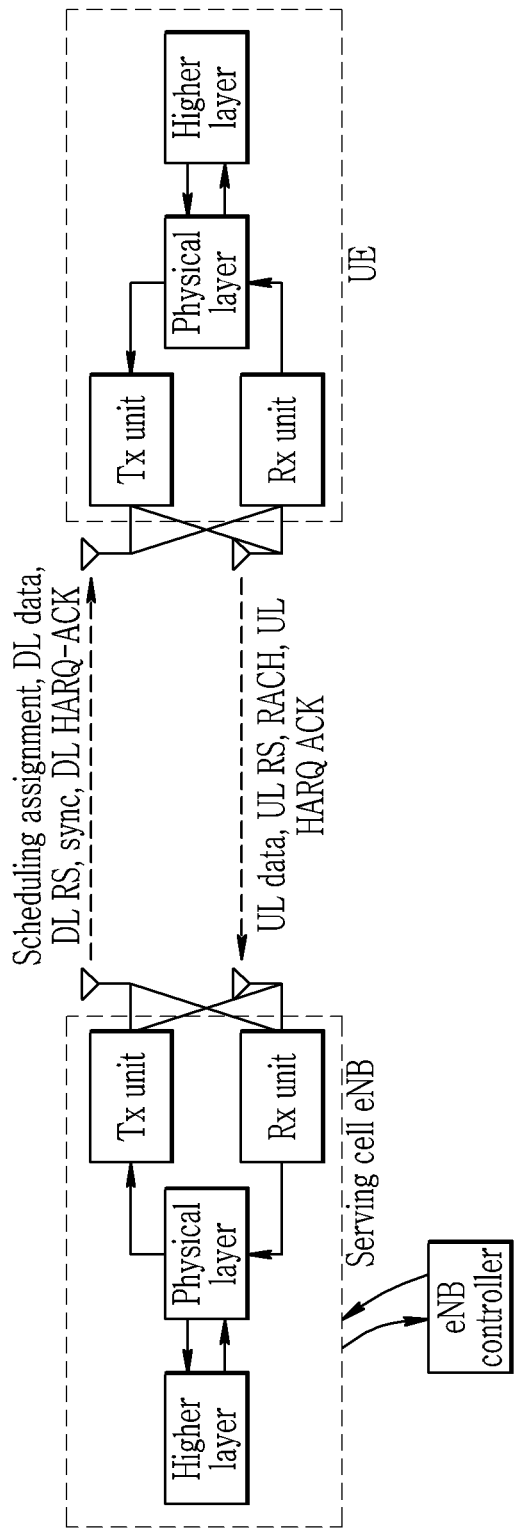
FIG. 2 is a view showing a serving cell eNB and a UE according to an exemplary embodiment of the present invention.

FIG. 2 is a view showing a serving cell eNB and a UE according to an exemplary embodiment of the present invention.

The serving cell eNB means the eNB serving (or providing) a serving cell. In detail, the serving cell eNB is controlled by an eNB controller. Each of the serving cell eNB and the UE includes a physical layer, an higher layer thereof, a transmitting unit, a receiving unit, and an antenna.

The signal transmitted by the serving cell (or the serving cell eNB) consists of an SA (scheduling assignment) for DL data and UL data, DL data, a DL RS (reference signal), a synchronization signal, and a DL HARQ-ACK (acknowledgement/negative acknowledgment) for the UL data decoding.

The UE receives the SA to transmit the UL data and the UL RS, performs a RACH procedure, and performs an operation of the UL HARQ-ACK for the DL data decoding.

To reduce the HARQ RTT of the TDD system, a method reducing a time taken for the DL assignment (assignment), the DL data burst, and the UL HARQ may be considered.

The LTE (long term evolution) TDD and the LTE FDD (frequency division duplex) allocates a DL assignment (for example, a PDCCH) and a DL data burst (for example, a PDSCH) in the same subframe, thereby performing the UL HARQ after the k subframes. Here, k is a value defined in an LTE standard, k for the LTE FDD is 4, and k for the LTE TDD has a different value depending on a UL-DL subframe configuration. By improving k, the method (for example, corresponding to a case of k=0) performing the DL assignment, the DL data burst, and the UL HARQ within the mixed subframe may be considered.

Since one or two time domain symbols are allocated for the UpPTS (uplink pilot time slot) in the LTE TDD system, the UE may transmit the PHY (physical) RS and the PRACH preamble, however the serving cell (or the serving cell eNB) does not allocate the PUCCH and the PUSCH in the UpPTS region. In this specification, a case in which the time domain symbol is an OFDM (orthogonal frequency division multiplexing) symbol or an SC (single carrier)-FDMA (frequency division multiple access) symbol is described as an example. However, this is merely an example, and an exemplary embodiment of the present invention may also be applied to a case in which the time domain symbol is a different symbol from the OFDM symbol or the SC-FDMA symbol.

For the extended UpPTS introduced in the LTE Rel-13, four or six time domain symbols may be allocated. Accordingly, for the UpPTS introduced in the LTE Rel-14, the PUSCH may be allocated in one, two, three, four, five, or six time domain symbols. Accordingly, in the UpPTS, the serving cell (or the serving cell eNB) may allocate the PUSCH.

Hereinafter, the method of transmitting the UL data in the extended UpPTS including the UpPTS and three or more time domain symbols will be described. Also, when the DL assignment, the DL data burst, and the UL HARQ are performed in one special subframe, the collision problem of the PUCCH may be solved through the above-described methods.

The special subframe includes a DwPTS (downlink pilot time slot), a GP (guard period), and the UpPTS.

In a case of the UL-DL subframe configuration 0 for the LTE TDD, the serving cell (or the serving cell eNB) transmits the UL grant for the UL subframes (n+6) and (n+7) in the special subframe n. For this, a bitmap is allocated in a DCI (downlink control information) format, and a UL subframe index to which the UL grant is applied is indicated. For example, if the bitmap is '10', the UL grant is applied to the UL subframe (n+6), if the bitmap is '01', the UL grant is applied to the UL subframe (n+7), and if the bitmap is '11', the UL grant is applied to the UL subframes (n+6) and (n+7).

The UL resource allocation is commonly applied to the subframes (n+6) and (n+7), thereby scheduling flexibility and an overhead reduction are controlled.

In a case of the UL-DL subframe configuration 0 for the TDD, to transmit the PUSCH in the special subframe by the UE, a different UL grant from the UL grant of the LTE is required.

The UpPTS and a PUSCH staring symbol index for the normal UL subframe are different, and the UpPTS and the RE (resource element) number of the normal UL subframe are different such that the UE may differently obtain the BLER (block error rate) if an RB (resource block) assignment and a MCS (modulation and coding scheme) are commonly applied.

When the number of time domain symbols belonging to the UpPTS is small, if the UL grant is separately defined, since the TBS (transport block size) is defined in the normal UL subframe, the TBS table considering the UpPTS must be separately defined. Otherwise, the TBS applied to the normal UL subframe must be reused in the UL symbol of the lesser number belonging the UpPTS. Accordingly, to ensure the same TBS to be available in the UL symbol of the lesser number, the serving cell (or the serving cell eNB) must allocate the RB of the greater number to the UE, and this affects the UL coverage.

A method (hereinafter, 'a method M100') of aggregating the special subframe n and the UL subframe (n+1) will be described.

Figure 3:
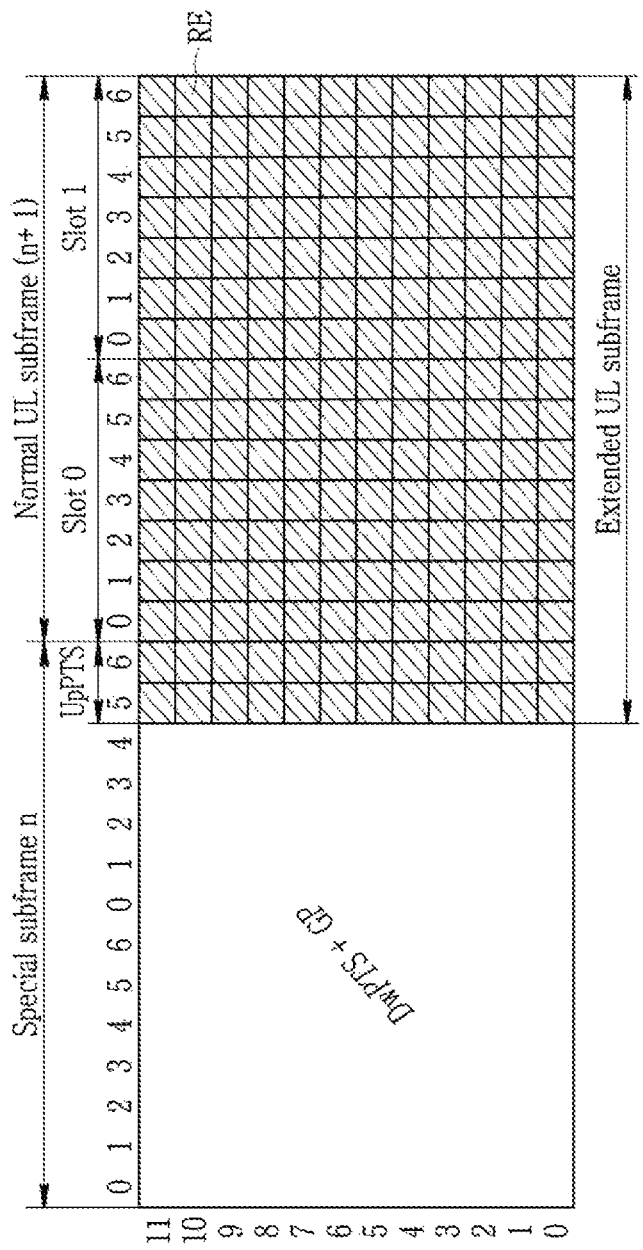
FIG. 3 is a view showing an extended UL subframe of which an UpPTS of a special subframe n and a normal UL subframe (n+1) are aggregated through a method M100 according to an exemplary embodiment of the present invention.

FIG. 3 is a view showing an extended UL subframe of which an UpPTS of a special subframe n and a normal UL subframe (n+1) are aggregated through a method M100 according to an exemplary embodiment of the present invention. In detail, in FIG. 3, the resource grid of the case that the UpPTS is defined in two time domain symbols is illustrated. In FIG. 3, a horizontal axis represents a time domain symbol, and a vertical axis represents a subcarrier. In the LTE system, to position the DM (demodulation)-RS at the center of the slot (the time domain symbol index 3 in the case of the normal CP, one DM-RS symbol (for example, the time domain symbol for the DM-RS) is allocated for every slot, and the OCC (orthogonal cover code) 2 is applied between two DM-RS symbols. The DM-RS symbol index follows the time domain symbol index 3 depending on a value defined in a Rel-13 TS (technical specification).

Figure 4A:
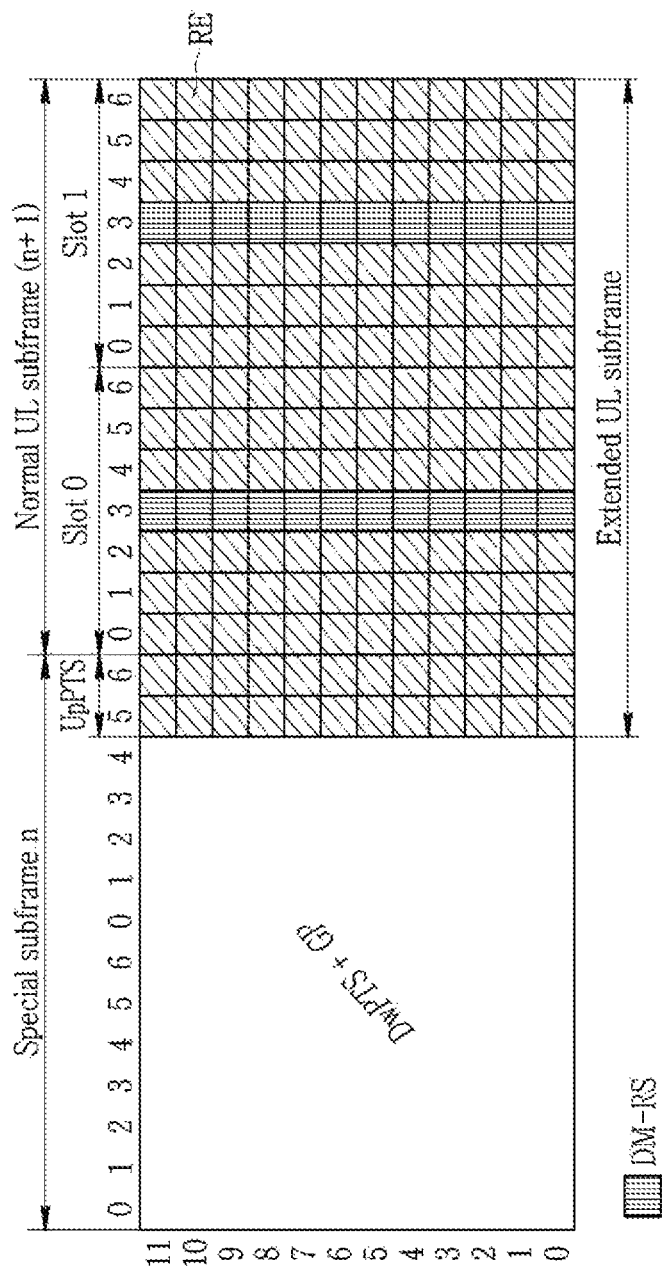
FIG. 4A, FIG. 4B, and FIG. 4C are views showing an extended UL subframe having a DM-RS symbol according to an exemplary embodiment of the present invention.
Figure 4B:
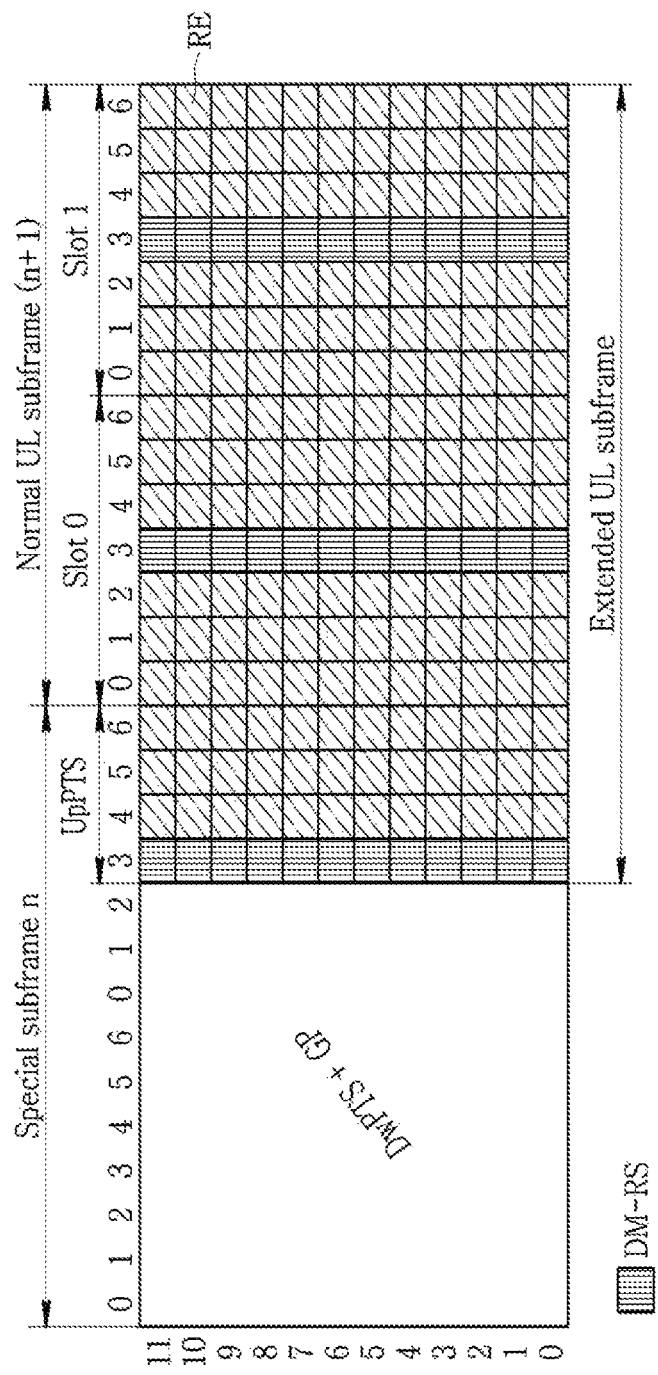
Figure 4C:
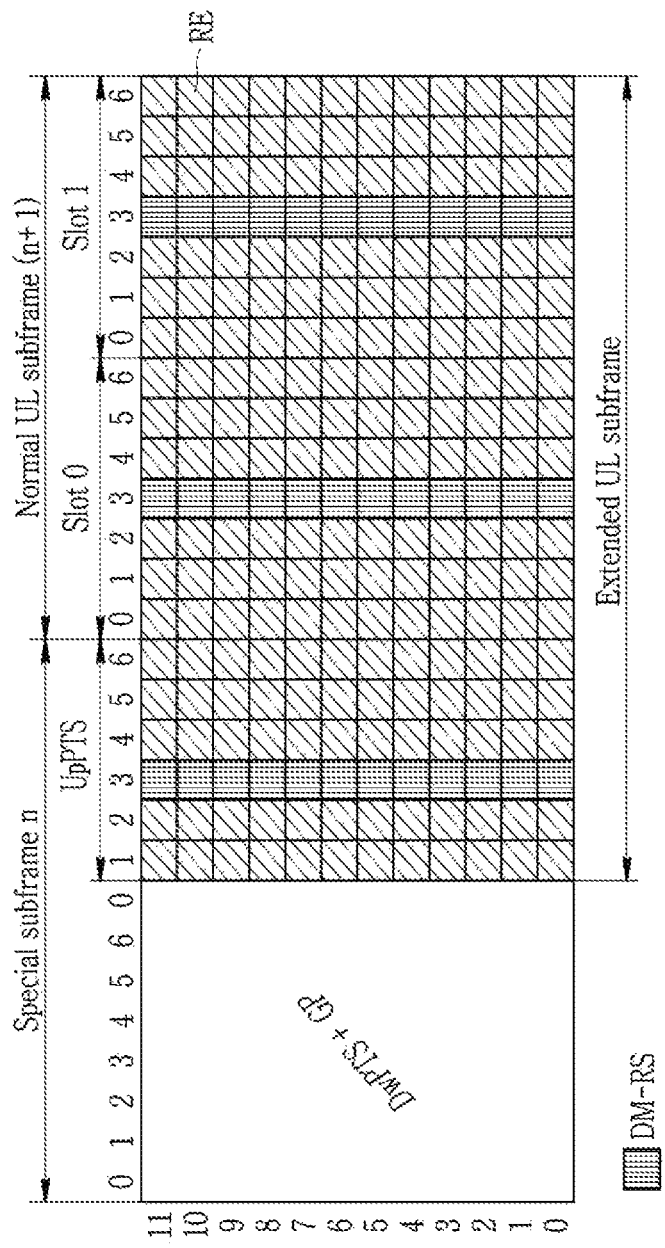

FIG. 4A, FIG. 4B, and FIG. 4C are views showing an extended UL subframe having a DM-RS symbol according to an exemplary embodiment of the present invention.

In detail, FIG. 4A illustrates the extended UL subframe of the case that the UpPTS occupies two time domain symbols, FIG. 4B illustrates the extended UL subframe of the case that the UpPTS occupies four time domain symbols, and FIG. 4C illustrates the extended UL subframe of the case that the UpPTS occupies six time domain symbols.

The communication node (for example, the UE) may receive the DM-RS configuration for the UpPTS from the other communication node (for example, the eNB). In detail, the communication node (for example, the eNB) may configure the DM-RS for the UpPTS through an RRC configuration to the communication node (for example, the UE). For example, the communication node (for example, the eNB) may determine the DM-RS configuration based on the number of time domain symbols belonging to the UpPTS, and may transmit the determined DM-RS configuration to the UE.

When the number of time domain symbols belonging to the UpPTS is three or less, the communication node (for example, the UE) may only allocate the DM-RS to the normal UL subframe of the UpPTS and the normal UL subframe based on the DM-RS configuration. When the number of time domain symbols belonging to the UpPTS is four, the communication node (for example, the UE) may allocate the DM-RS to the UpPTS and the normal UL subframe based on the DM-RS configuration. That is, the communication node (for example, the UE) may allocate the DM-RS to the UpPTS depending on the number of time domain symbols belonging to the UpPTS.

As illustrated in FIG. 4A, in the extended UL subframe, when the UpPTS occupies one or two time domain symbols, a separate PUSCH DM-RS for the UpPTS may not be allocated, and one DM-RS symbol may be allocated for each UL slot of the normal UL subframe.

In contrast, in the extended UL subframe, when the UpPTS occupies more than half of the UL slot (for example, four or more time domain symbols), one DM-RS symbol may be allocated for the UpPTS, and one DM-RS symbol may be allocated for each UL slot of the normal UL subframe. The communication node (for example, the UE)

may allocate the DM-RS to the 4th time domain symbol (for example, the symbol index 3) from an end among the time domain symbols belonging to the UpPTS.

For example, based on the number of time domain symbols included in the UpPTS, the extended UL subframe may have the shapes of FIG. 4B or 4C.

In FIG. 4B and FIG. 4C, the case that the extended UL subframe has three DM-RS symbols is described. In this case, the OCC of the DM-RS symbol allocated in the UpPTS region uses the OCC of the DM-RS symbol allocated in the second UL slot (for example, the slot 1) region of the normal UL subframe.

Also, a cyclic shift ($n_{DMRS,\lambda}^{(2)}$) of the DM-RS symbol allocated in the UpPTS region uses a cyclic shift of the DM-RS symbol allocated in the second UL slot (for example, the slot 1) region of the normal UL subframe. That is, the OCC or the cyclic shift for the DM-RS allocated in the UpPTS may be the same as the OCC or the cyclic shift for the DM-RS allocated in the slot 1.

In the extended UL subframe, to avoid the collision when the SRS (the sounding reference signal) is predetermined, PUSCH rate matching (rate matching) may be defined.

In the extended UL subframe, the same PUSCH TPC (transmit power control) may be applied to the special subframe and the UL subframe. A time that the serving cell (or the serving cell eNB) transmits a TPC command for the PUSCH transmission to the UE in the extended UL subframe is fixed to the UL subframe index that is not the index of the special subframe. Subframe ranges at which the TPC command received by the UE from the serving cell (or the serving cell eNB) is applied may include a case of transmitting the PUSCH only in the UL subframe while not transmitting the PUSCH in the special subframe by the UE and a case of transmitting the PUSCH in the extended UL subframe.

The communication node (for example, the UE) may receive one UL grant for the scheduling of the extended UL subframe from the communication node (for example, the eNB).

To allocate the PUSCH in the extended UL subframe, the UL grant is transmitted based on the normal UL subframe index. That is, the subframe in which the UL grant for the PUSCH to be transmitted in the extended UL subframe is transmitted may be based on the normal UL subframe index. As an example, when the extended UL subframe consists of the subframe index {1, 2}, just as the PUSCH is transmitted in the subframe index 2, the UL grant is transmitted to the UE. As an example, when the extended UL subframe consists of the subframe index {6, 7}, just as the PUSCH is transmitted in the subframe index 7, the UL grant is transmitted to the UE. A time relationship between the PUSCHs of the UL grant and the extended UL subframe is depending on a relationship defined in a conventional LTE standard (for example, Rel-13 TS 36.213). If the PDCCH is transmitted in the DL subframe index n, the PUSCH for this is transmitted in the UL subframe index (n+k). Here, the value of k is defined in Rel-13 TS 36.213 Table 8-2 or Section 8. That is, the index of the DL subframe in which the UL grant for the extended UL subframe is transmitted may be determined based on the index of the UL subframe included in the extended UL subframe.

When the UE retransmits the PUSCH transmitted in the extended UL subframe or the subframe in which the PUSCH is retransmitted is the normal UL subframe, the serving cell (or the serving cell eNB) may separately include an MCS offset to be applied to the PUSCH to be retransmitted through the UL grant in the UL grant to be signaled (adaptive retransmission).

A retransmission time in the extended UL subframe may be determined based on the index of the normal UL subframe. This has a merit that an additional UL grant is not transmitted while backward compatibility of the LTE is observed.

Hereinafter, the timing relationship applied to the method receiving the PHICH subframe and transmitting the PUSCH performing the retransmission thereof to the extended UL subframe will be described. Here, when the subframe index is 10 or more, 1 is added to a radio frame index, and 10 is subtracted from the value of the subframe index.

As an example, when the extended UL subframe includes the special subframe 1 and the UL subframe 2, the subframe index for the extended UL subframe is 2. As another example, when the extended UL subframe includes the special subframe 6 and the UL subframe 7, the subframe index for the extended UL subframe is 7. In this case, the PHICH subframe and the PUSCH subframe performing the retransmission thereof may be determined as defined in the conventional LTE standard (for example, Rel-13 TS 36.213). The PHICH is transmitted in the DL subframe n and the PUSCH thereof is transmitted in the UL subframe (n+k). Here, the value of k is defined in Rel-13 TS 36.213 Table 8-2 or Section 8.

In other words, in the case of a TDD UL/DL subframe configuration 2 of the LTE, if the PHICH is transmitted in the DL subframe index 3, the PUSCH performing the retransmission thereof is transmitted in the UL subframe index 7. If the PHICH is transmitted in the DL subframe index 8, the PUSCH performing the retransmission thereof is transmitted in the UL subframe index 12. By simplifying this, (PHICH, PUSCH) may be expressed as (3, 7) or (8, 12).

The above-mentioned rule is applied. If the PHICH is transmitted in the DL subframe index 3, the PUSCH performing the retransmission thereof is transmitted in the extended UL subframe index 7 (for example, the extended UL subframe consists of the subframe index {6, 7}). If the PHICH is transmitted in the DL subframe index 8, the PUSCH performing the retransmission thereof is transmitted in the extended UL subframe index 12 (for example, the extended UL subframe consists of the subframe index {1, 2}). By simplifying this, (PHICH, second PUSCH may be expressed by (3, 7) or (8, 12), and (PHICH, first PUSCH) may be expressed by (3, 6) or (8, 11).

That is, when the communication node (for example, UE) receives the PHICH from the communication node (for example, eNB) in the DL subframe n, the PUSCH for the retransmission may be transmitted to the communication node (for example, eNB) in the extended UL subframe index (n+k). Here, each index of the special subframe and the normal UL subframe included in the extended UL subframe is (n+(k−1), (n+k).

Also, in a case of a TDD UL/DL subframe configuration 3 of the LTE, Rel-13 TS 36.213 Table 8-2 is applied. If the PHICH is transmitted in the DL subframe index 0, the PUSCH performing the retransmission thereof is transmitted in the UL subframe index 4. If the PHICH is transmitted in the DL subframe index 8, the PUSCH performing the retransmission thereof is transmitted in the UL subframe index 12. If the PHICH is transmitted in the DL subframe index 9, the PUSCH performing the retransmission thereof is transmitted in the UL subframe index 13. By this simplifying this, (PHICH, PUSCH) is expressed as (0, 4), (8, 12), or (9, 13).

The above-mentioned rule is applied. If the PHICH is transmitted in the DL subframe index 8, the PUSCH performing the retransmission thereof is transmitted in the extended UL subframe index 2 (for example, the extended UL subframe consists of the subframe index {1, 2}). By simplifying this, (PHICH, second PUSCH) may be expressed as (8, 12), and (PHICH, first PUSCH) may be expressed as (8, 11).

Also, in the case of the TDD UL/DL subframe configuration 6 of the LTE, Rel-13 TS 36.213 Table 8-2 is applied. If the PHICH is transmitted in the DL subframe index 0, the PUSCH performing the retransmission thereof is transmitted in the UL subframe index 7. If the PHICH is transmitted in the DL subframe index 1, the PUSCH performing the retransmission thereof is transmitted in the UL subframe index 8. If the PHICH is transmitted in the DL subframe index 5, the PUSCH performing the retransmission thereof is transmitted in the UL subframe index 12. If the PHICH is transmitted in the DL subframe index 6, the PUSCH performing the retransmission thereof is transmitted in the UL subframe index 13. If the PHICH is transmitted in the DL subframe index 9, the PUSCH performing the retransmission thereof is transmitted in the UL subframe index 14. By simplifying this, (PHICH, PUSCH) may be expressed as (0, 7), (1, 8), (5, 12), (6, 13), or (9, 14).

The above-mentioned rule is applied. If the PHICH is transmitted in the DL subframe index 0, the PUSCH performing the retransmission thereof is transmitted in the extended UL subframe index 7 (for example, the extended UL subframe consists of the subframe index {6, 7}). If the PHICH is transmitted in the DL subframe index 5, the PUSCH performing the retransmission thereof is transmitted in the extended UL subframe index 12 (for example, the extended UL subframe consists of the subframe index {1, 2}). By simplifying this, (PHICH, second PUSCH) may be expressed as (0, 7) or (5, 12), and (PHICH, first PUSCH) may be expressed as (0, 6) or (5, 11).

The above-described method may be applied to a case from the TDD UL/DL subframe configuration that is different from the above-described example.

A method (hereinafter, 'a method M200') separately defining the UL grant only for the special subframe n will be described. The method M200 is only applied to the UpPTS belonging to the special subframe n without being applied to the extended UL subframe or the normal UL subframe. If the method M200 is used, two UL grants exist to transmit the PUSCH in the extended UL subframe. In this case, the UE must receive the UL grant for the special subframe and the UL grant for the normal UL subframe.

For the PUSCH transmitted in the extended UL subframe, if the special subframe and the normal UL subframe are scheduled by the UL grants that are different from each other, a method M210 and a method M220 may be used as below.

The method M210 for the method M200 is a method in which the UL grant to allocate the PUSCH in the special subframe all includes the RB assignment and the MCS. The method M210 may also be applied to a case that the PUSCH is transmitted only using the special subframe as well as a case that the PUSCH is transmitted in the extended UL subframe.

The method M220 for the method M200 is a method in which the RB assignment is unified, while the MCS is separately defined, for the UL grant to allocate the PUSCH in the special subframe and the UL grant to allocate the PUSCH in the normal UL subframe. In the method M220, the RB assignment for the special subframe and the RB assignment for the normal UL subframe are the same such that the RB assignment information may be included in only one UL grant. As an example, the RB assignment information may be included only in the UL grant scheduling the normal UL subframe, and the RB assignment information may not be included in the UL grant scheduling the special subframe. In this case, the UE may equally apply the RB assignment information to the special subframe and the normal UL subframe.

A method M221 for the method M220 is a method in which the UL grant includes the MCS offset. A difference (for example, MCS2−MCS1) between the MCS1 to be applied to the PUSCH transmitted in the special subframe and the MCS2 to be applied to the PUSCH transmitted in the normal UL subframe is included in the UL grant, so a number of bits for encoding of the MCS may be reduced. As an example, to indicate the MCS1 to be applied to the PUSCH transmitted in the special subframe to the UE, the UL grant for the PUSCH to be transmitted in the special subframe may include (MCS2−MCS1). As the UE decodes the MCS2 after additionally receiving the UL grant for the PUSCH to be transmitted in the normal UL subframe, the MCS1 may be derived. As another example, because the special subframe is always generated earlier than the normal UL subframe, the UL grant for the PUSCH to be transmitted in the special subframe includes the MCS1, and the UL grant for the PUSCH to be transmitted in the normal UL subframe may include (MCS2−MCS1). In this case, the UE may obtain the MCS1 and the MCS2 at an earlier time.

The MCS offset includes both negative and positive values. The MCS offset is only positive when the TBS increases compared to a reference TBS, and the MCS offset is only negative when the TBS decreases compared to the reference TBS. The MCS applied to the PUSCH to be transmitted in the UpPTS is determined as (MCS+MCS offset) for each TB. The method in which the UE receives the MCS and the MCS offset follows the above-described method.

The method M230 for the method M200 performs adaptive retransmission.

The serving cell (or the serving cell eNB) may transmit the PHICH in the subframe n, and in a case of a NACK (negative acknowledgment), the UE may retransmit the PUSCH in the subframe (n+g). Here, a value of g may be determined depending on the technical specification or by the UE depending on higher layer signaling.

The PHICH is transmitted in the DL subframe or the DwPTS of the special subframe and is transmitted in the subframe (n+k). Here, a value of k is determined as a predetermined value defined in the TS. If the UE does not receive the UL grant of the corresponding TB within a time window, the UE regards that the decoding for the corresponding TB succeeds in the serving cell (or the serving cell eNB). In this case, the UE may flush the corresponding TB in a soft buffer. To support the above-described retransmission procedure, the index of at least a HARQ process must be included in the UL grant.

On the other hand, when the PUSCH is allocated to the extended UL subframe, the UE transmits the PUSCH and receives a HARQ-ACK thereof through a PHICH from the serving cell (or the serving cell eNB). A transmission timing of the PHICH may be calculated based on the normal UL subframe index (for example, 2 or 7) transmitted with the PUSCH. Here, when the subframe index is 10 or more, 1 is added to the radio frame index, and 10 is subtracted from the value of the subframe index.

As an example, for applying the timing of the PHICH subframe for the extended UL subframe, when the extended UL subframe includes the special subframe 1 and the UL subframe 2, the subframe index for the extended UL subframe is 2. As another example, when the extended UL subframe includes the special subframe 6 and the UL subframe 7, the subframe index for the extended UL subframe is 7. That is, the extended UL subframe index may be determined to be the same as the index of the UL subframe included in the extended UL subframe.

Also, in the application of the timing of the extended PUSCH subframe for the PHICH subframe, when the extended UL subframe includes the special subframe 1 and the UL subframe 2, the subframe index for the extended UL subframe is 2. As another example, when the extended UL subframe includes the special subframe 6 and the UL subframe 7, the subframe index for the extended UL subframe is 7. In this case, the PUSCH subframe and the PHICH subframe transmitted therefor may be determined as defined in a conventional LTE standard (for example, Rel-13 TS 36.213). The PUSCH is transmitted in the UL subframe (n–I) and the PHICH thereof is transmitted in the DL subframe n. Here, the value of I is defined in Rel-13 TS 36.213 table 8.3-1 and the section 8.

In other words, in a case of a TDD UL/DL subframe configuration 2 of the LTE, if the UE transmits the PUSCH in the UL subframe index 2, the serving cell (or the serving cell eNB) transmits the PHICH thereof in the DL subframe index 8. If the PUSCH is transmitted in the UL subframe index 7, the PHICH thereof is transmitted in the DL subframe index 13. by simplifying this, the (PUSCH, PHICH) may be expressed like (2, 8) or (7, 13).

The above-mentioned rule is applied. If the PUSCH is transmitted in the extended UL subframe index 2 (for example, the extended UL subframe consists of the subframe index {1,2}), the PHICH thereof is transmitted in the DL subframe index 8. If the PUSCH is transmitted in the extended UL subframe index 7 (for example, the extended UL subframe consists of the subframe index {6,7}), the PHICH thereof is transmitted in the DL subframe index 13. By simplifying this, (second PUSCH, PHICH) may be expressed as (2, 8) or (7, 13), and (first PUSCH, PHICH) may be expressed as (1, 8) or (6, 13).

That is, the communication node (for example, the UE) may transmit the UL data channel (for example, the PUSCH) to the communication node (for example, the eNB) in the extended UL subframe index (n–I), and may receive the response channel (for example, the PHICH) for the UL data channel (for example, PUSCH) from the communication node (for example, the eNB) in the DL subframe index n. Here, each index of the special subframe and the normal UL subframe included in the extended UL subframe is (n–I–1), (n–I).

In the case of the TDD UL/DL subframe configuration (subframe configuration) 3 of the LTE, if the UE transmits the PUSCH in the UL subframe index 2, the serving cell (or the serving cell eNB) transmits the PHICH thereof in the DL subframe index 8. If the PUSCH is transmitted in the UL subframe index 3, the PHICH thereof is transmitted in the DL subframe index 9. If the PUSCH is transmitted in the UL subframe index 4, the PHICH thereof is transmitted in the DL subframe index 10. By simplifying this, (PUSCH, PHICH) may be expressed as (2, 8), (3, 9), or (4, 10).

The above-mentioned rule is applied. If the PUSCH is transmitted in the extended UL subframe index 2 (for example, the extended UL subframe consists of the subframe index {1,2}), the PHICH thereof is transmitted in the DL subframe index 8. By simplifying this, (second PUSCH, PHICH) may be expressed as (2, 8), and (first PUSCH, PHICH) may be expressed as (1, 8).

The above-described method may be applied to the case that the TDD UL/DL subframe configuration is different from the above-described example.

A rate matching method (hereinafter, 'a method M300') for the PUSCH will now be described.

The UpPTS may be interfered with by the PRACH preamble or the SRS. Accordingly, the LTE system previously determines an SRS symbol (for example, the time domain symbol of the SRS) to define a shortened PUSCH and transmits the shortened PUSCH in the UL subframe.

This may be applied to a case that only the UL grant for the UpPTS is transmitted and a case that the UL grant for the extended UL subframe is transmitted.

The serving cell (or the serving cell eNB) may not allocate the PUSCH in the RB in which the PRACH preamble format 4 is transmitted.

The method M310 for the method M300 is a method of configuring the PUSCH DM-RS symbol and the SRS symbol to consist of the PUSCH DM-RS symbol and the SRS symbol. The method M310 may increase the interference between the PUSCH DM-RS and the SRS, but may reduce the interference between the data RE of the PUSCH and the SRS. Since the SRS and the PUSCH DM-RS act as interference to each other, the serving cell (or the serving cell eNB) estimates UL CSI (channel state information) by considering this estimation. Also, the serving cell (or the serving cell eNB) may utilize the UL CSI for UL MU (multi user)-MIMO (multiple input multiple output) pairing, a UL link adaptation, and so on.

The method M320 for the method M300 is a method of configuring the PUSCH DM-RS symbol and the SRS symbol to differentiate the PUSCH DM-RS symbol and the SRS symbol. The PUSCH allocated in the UpPTS may cause the interference with the SRS in the arbitrary time domain symbol. Accordingly, as the serving cell (or the serving cell eNB) limits the SRS symbol of the UEs to predetermined time domain symbols, the interference between the PUSCH and the SRS may be controlled. As an example, to increase a decoding probability of the PUSCH, the PUSCH rate matching in which the PUSCH is not allocated may be performed in the SRS symbol. However, the method M320 may be applied to the UpPTS in which there are not many time domain symbols including the PUSCH, and the method M320 may be applied to the extended UL subframe. When the UpPTS consists of two time domain symbols, if the SRS symbol is independently allocated within the special subframe, the time domain symbol transmitted with the PUSCH remains as one. Accordingly, when the SRS symbol is independently allocated, the SRS symbol may be independently allocated in the normal UL subframe that is not the special subframe.

A method M330 for the method M300 is a method performing the PUSCH rate matching. The method M320 does not allocate the PUSCH in the SRS symbol, thereby reducing a transmission amount of the PUSCH. The method M330 relatively slightly reducing the transmission amount of the PUSCH rate-matches the PUSCH by considering the SRS comb, resultantly increasing a throughput of the PUSCH. The serving cell (or the serving cell eNB) may align the SRS resource and may perform the PUSCH rate matching to avoid the aligned SRS resource (for example, a sector aligned SRS resource element). When aligning the SRS resource configured to the different UEs from each other, the serving cell (or the serving cell eNB) may be configured such that the SRS resources occur in the same time symbol and to have the same subcarrier shift (or a comb) to the UE through the higher layer signaling. Accordingly, the serving cell (or the serving cell eNB) does not distinguish the aligned SRS resource through the comb and may use a successive cancellation receiver to distinguish through a cyclic shift.

Figure 5A:
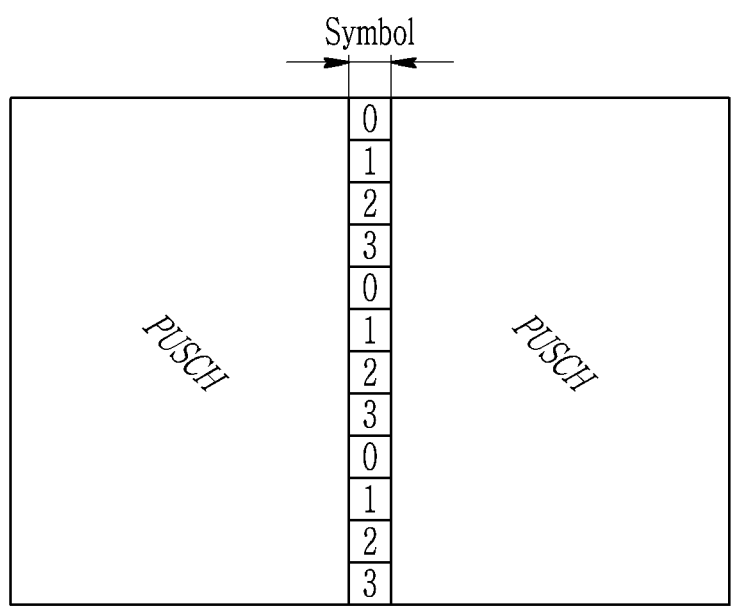
FIG. 5A and FIG. 5B are views of PUSCH rate matching for a case that an SRS symbol and a DM-RS symbol are matched according to an exemplary embodiment of the present invention.
Figure 5B:
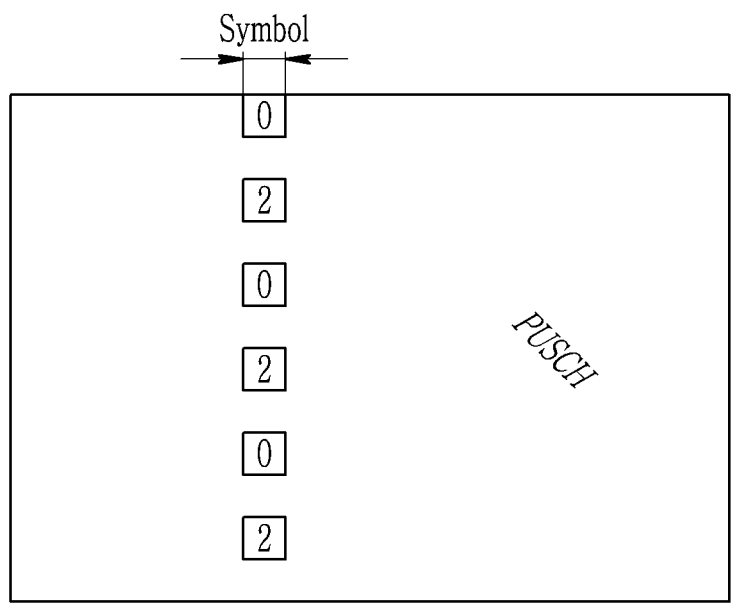

FIG. 5A and FIG. 5B are views of PUSCH rate matching for a case that an SRS symbol and a DM-RS symbol are matched according to an exemplary embodiment of the present invention.

In detail, FIG. 5A illustrates the case that the SRS symbol and the DM-RS symbol are matched by the method M310, and FIG. 5B illustrates the case using 'a sector aligned SRS comb' by the method M330. When the UEs belonging to one virtual/physical sector transmit the SRS, the serving cell (or the serving cell eNB) may configure the 'sector aligned SRS comb' to the UE through the RRC configuration to deliberately cause the collision of the SRSs. The SRSs collide, however the number of REs occupied with the SRS is small such that the transmission amount or the throughput of the PUSCH may be improved.

In FIG. 5A, the method of configuring to the UE to have the SRS symbol index and the DM-RS symbol index is illustrated. The serving cell (or the serving cell eNB) allocates the SRS symbol having four transmission combs in one time domain symbol, and one number (for example, 0, 1, 2, or 3) means a subcarrier shift. To avoid the interference between the SRS symbol and the PUSCH symbol, an RRC (radio resource control) is configured for the PUSCH DM-RS symbol and the SRS symbol to be equal. In this case, if the DM-RS symbol index is configured as 3 (for example, the case of the normal CP), the SRS symbol index is also configured as 3. In the method illustrated in FIG. 5A, for the SRS, it is not necessary to individually rate-match the PUSCH.

In FIG. 5B, the method of configuring the transmission comb in the SRS symbol to coincide is illustrated. As an example, if four transmission combs are not configured and two transmission combs among them are configured, the RE corresponding to the two remaining transmission combs among them may be allocated in the PUSCH. In this case, the UE allocates the PUSCH for the corresponding transmission combs and does not allocate the data for the remaining transmission combs. Therefore, the method shown in FIG. 5B must perform the PUSCH rate matching for the SRS. The method shown in FIG. 5B may also allocate the UL data in the SRS symbol such that the UL transmission amount or the throughput may increase.

Hereinafter, the method of avoiding the PUCCH collision when utilizing a URLLC and a dual connectivity scenario will be described.

The eNB transmits the signal in one a plurality of carriers, and the UE may perform the communication with the eNB in a state that the receiving of one of a plurality of carriers is configured.

The radio frame performing a wireless communication consists of several subframes, and one subframe consists of several multi-carrier symbols. A numerology applied to the multi-carrier modulation is parameterized such that the several multi-carrier symbols may coexist in one subframe.

A TTI (transmission time interval) used in the present specification means a unit of a data packet capable of being dynamically scheduled.

As a main scenario supported by the wireless communication system, an eMBB (enhanced MBB) and a URLLC may be considered. The eMBB is a service pursuing the high transmission amount or throughput, but the URLLC is a service pursuing the low delay time (latency) such that requirements shortly defining the TTI need to support the eMBB and the URLLC through one system.

Figure 6A:
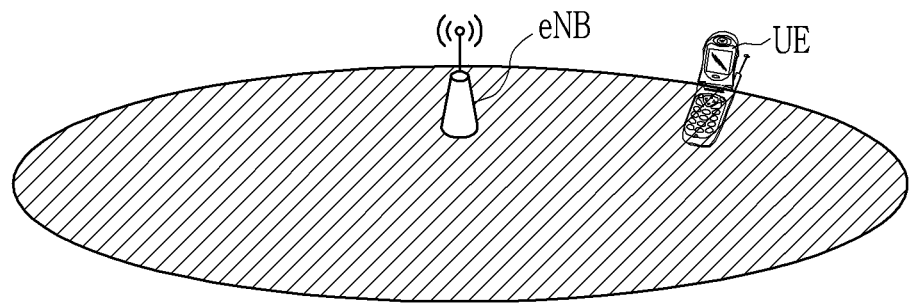
FIG. 6A is a view showing a single carrier scenario.
Figure 6B:
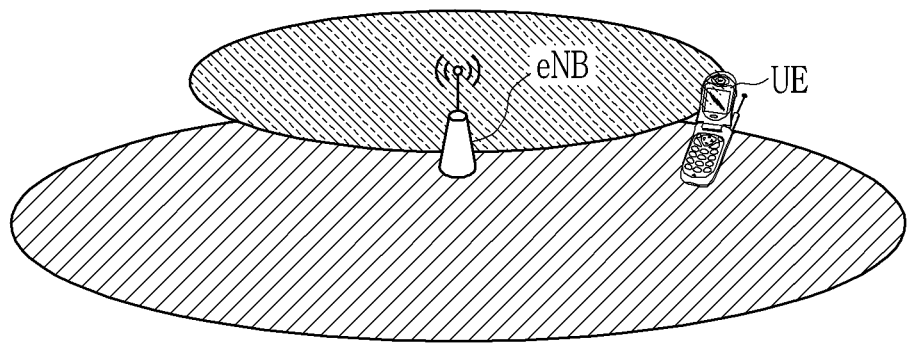
FIG. 6B is a view showing a multi-carrier scenario.

FIG. 6A is a view showing a single carrier scenario, and FIG. 6B is a view showing a multi-carrier scenario.

As illustrated in FIG. 6A, the wireless communication system may support several TTIs in the single-carrier operation. The wireless communication system may vary a length of the TTI by using a plurality of parameters of the multi-carrier symbol. As an example, when considering OFDM (orthogonal frequency division multiplexing) modulation, the wireless communication system may use several subcarrier spacings.

As an example, a first TTI may consist of $N_1$ OFDM symbols (each OFDM symbol has 15 kHz subcarrier spacing), and a second TTI may consist of $N_2$ OFDM symbols (each OFDM symbol has 60 kHz subcarrier spacing. The length of the first TTI and the length of the second TTI may be different from each other. For this, the NR (new radio) supports a mixed numerology.

In contrast, as illustrated in FIG. 6B, the wireless communication system uses the multi-carrier symbol having one parameter, and one TTI may be configured by controlling the number of the time domain symbols belonging to the TTI. As an example, when the wireless communication system considers the OFDM modulation, the first TTI consists of the $N_1$ OFDM symbol (each OFDM symbol has the 15 kHz subcarrier spacing), and the second TTI consists of the $N_2$ OFDM symbol (each OFDM symbol has the 15 kHz subcarrier spacing. The length of the first TTI and the length of the second TTI are different from each other. This is supported by the NR and LTE Advanced Pro.

Also, the wireless communication system may use the length of the TTI through the multi-carrier operation. As an example, the wireless communication system may support the LTE and the NR through dual connectivity. The wireless communication system may deploy the LTE in the frequency range within 6 GHz and the NR in the frequency range near 30 GHz. In this case, the LTE uses the OFDM symbol having the 15 kHz subcarrier spacing depending on the standard, however the NR may use the OFDM symbol having the 60 kHz subcarrier spacing. The LTE is operated based on the first TTI, and the NR is operated based on the second TTI.

As described above, a predetermined method of the TTI is various and merits of the predetermined method of each TTI are as follows.

As an example, the wireless communication system may configure one DL TTI and one UL TTI. In detail, a system (hereinafter, 'a system1a') in which the DL TTI and the UL TTI are equal, a system (hereinafter, 'a system1b') in which the UL TTI is longer based on the DL TTI, and a system (hereinafter, 'a system1c') in which the UL TTI is shorter based on the DL TTI may be defined. As the system1b elongates the UL TTI, UL coverage enhancement may be obtained. As the system1c reduces the UL TTI, the UL delay time (latency) may be reduced.

As another example, the wireless communication system may configure one or more DL TTIs and one or more UL TTIs. In detail, a system (hereinafter, 'a system2a') configuring one DL TTI and two UL TTIs, a system (hereinafter, 'a system2b') configuring two DL TTIs and one UL TTI, and a system (hereinafter, 'a system2c') configuring two DL TTIs and two UL TTIs may be defined. The system2a may use the short UL TTI to reduce the UL latency and the long UL TTI to obtain the UL coverage. In contrast, the system 2b may use the short DL TTI to reduce the DL latency and the long DL TTI to obtain the DL coverage. The system 2c may obtain both the delay time and the coverage in the UL and the DL.

A case that one TTI is defined may be divided into a case that TTI is defined to be long and a case that the TTI is defined to be short, and this is illustrated in Table 1 (a division of the TTI configuration) below.

TABLE 1

| Case | TTI reference | Numerology reference (kHz) |
|---|---|---|
| Case that one numerology is configured to one UE | 1. (DL, UL) = (bTTI, bTTI)<br>2. (DL, UL) = (sTTI, bTTI)<br>3. (DL, UL) = (bTTI, sTTI)<br>4. (DL, UL) = (sTTI, sTTI) | 5. (DL, UL) = 15 and 15<br>6. (DL, UL) = 60 and 15<br>7. (DL, UL) = 15 and 60<br>8. (DL, UL) = 60 and 60 |
| Case that two numerologies are configured to one UE | 9. (DL, UL) = (sTTI&bTTI, bTTI)<br>10. (DL, UL) = (sTTI&bTTI, sTTI)<br><br>11. (DL, UL) = (bTTI, sTTI&bTTI)<br>12. (DL, UL) = (sTTI, sTTI&bTTI)<br>13. (DL, UL) = (sTTI, bTTI) & (bTTI, sTTI)<br>14. (DL, UL) = (sTTI, sTTI) & (bTTI, bTTI) | 15. (DL, UL) = (15& 60, 15)<br>16. (DL, UL) = (15& 60, 60)<br>17. (DL, UL) = (15, 15 & 60)<br>18. (DL, UL) = (60, 15 & 60)<br>19. (DL, UL) = 60 and 15 & 15 and 60<br>20. (DL, UL) = 15 and 15 & 60 and 60 |

In Table 1, bTTI means a relatively long TTI, and sTTI means a relatively short TTI. In Table 1, when the numerology is different, the 15 kHz subcarrier spacing and the 60 kHz subcarrier spacing are compared, however it is only the example, and 15 kHz and 60 kHz in Table 1 may be replaced with any two numbers. In this case, the TTI configured of the 15 kHz OFDM symbol is relatively long, and the TTI configured of the 60 kHz OFDM symbol is relatively long. As another example, the 30 kHz subcarrier spacing may be used to configure the relatively long TTI, and the 60 kHz subcarrier spacing may be to used to configure the relatively short TTI.

Among 20 cases (a case 1-a case 20) provided in Table 1, in the case 11 and the case 17, the collision predicted by the UE is generated. In detail, a cycle of the DL control is determined based on the bTTI, and the UL data is granted based on the sTTI such that the UE may predict the collision.

In contrast, in the case 12 and the case 18, the collision that is not predicted by the UE may be generated. In detailed, since the cycle of the DL control is determined based on the sTTI, the UL data may be transmitted based on the sTTI while the UE transmits the UL data based on the bTTI.

That is, when the cycle of the DL control channel and the cycle of the UL control channel are different from each other, a transmission overlap that is not predicted by the UE is generated. The transmission overlap that is not previously predicted by the UE is independent of the number of multi-carrier symbols and the used numerology.

In a case of the system managing the DL scheduling assignment-based two cycles in the DL control channel, a method in which the technical specification allows implementation complexity (for example, the implementation complexity receiving two or more DL controls and processing the overlap of the data transmission) to the UE may be used.

In the DL control channel, the system managing two UL scheduling grants should transmit other UL data while transmitting the UL data. The case related to this may be summarized as in Table 1. As an example, a case a1 of transmitting the bPUSCH and at least one sPUSCH, a case a2 of transmitting the bPUSCH and at least one sPUCCH, a case a3 of transmitting the bPUCCH and at least one sPUSCH, and a case a4 of transmitting the bPUCCH and at least one sPUCCH may be provided. In the present specification, the PUXCH means the PUCCH or the PUSCH, and the sPUXCH (the short PUXCH) is relatively shorter than the bPUXCH (the base PUXCH).

Figure 7A:
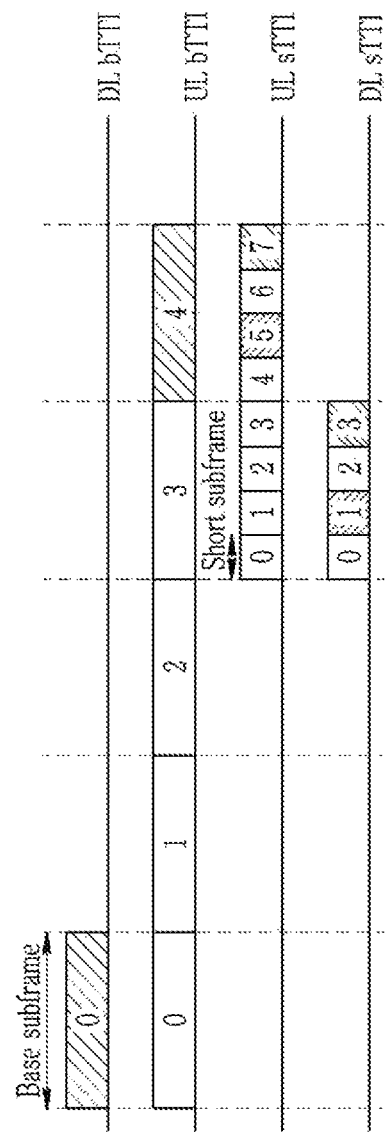
FIG. 7A and FIG. 7B are views showing a collision of a PUCCH.
Figure 7B:
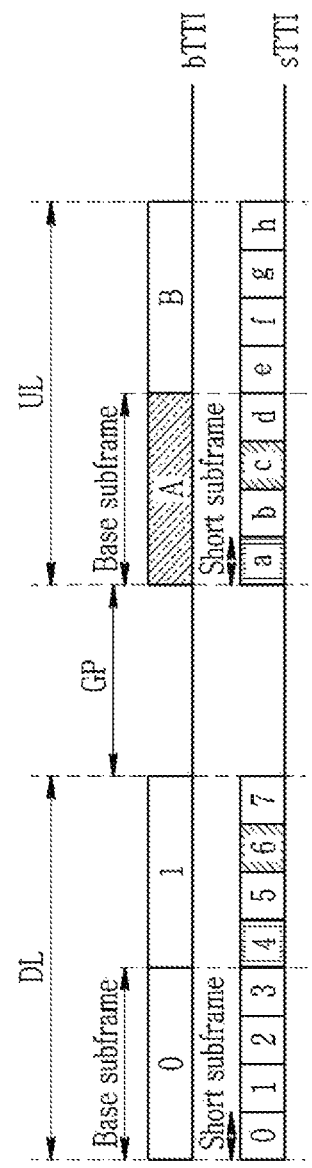

FIG. 7A and FIG. 7B are views showing a collision of a PUCCH.

In detail, FIG. 7A illustrates the collision between the bPUCCH and the sPUCCH in the FDD, and FIG. 7B illustrates the collision between the bPUCCH and the sPUCCH in the TDD.

As illustrated in FIG. 7A, the uplink data for the base subframe 4 instructed by the serving cell (or the serving cell eNB) in the base subframe 0 is transmitted based on the bTTI by the UE. The uplink data for the short subframes 5 and 7 instructed by the serving cell (or the serving cell eNB) in the short subframes 1 and 3 is transmitted based on the sTTI by the UE. In this case, since the uplink data transmission of the UE is overlapped in the base subframe 4 and the short subframes 5 and 7, a rule to avoid this is required.

On the other hand, as illustrated in FIG. 7B, the system is operated with the DL before the GP and is operated with the UL after the GP. The serving cell (or the serving cell eNB) may instruct the UE so as to transmit the data based on the bTTI in the base subframe A, and the serving cell (or the serving cell eNB) may instruct the UE so as to transmit the data based on the sTTI in the short subframes a and c. In this case, since the uplink data transmission of the UE is overlapped in the base subframe A and the short subframes a and c, a rule to avoid this is required.

Next, a method (for example, a method P300, a method P400, a method P500, etc.) to solve this will be described.

The method P300 is a method in which the UE feeds back the sPUCCH or the sPUSCH along with the base HARQ-ACK.

The method P400 is a method in which the UE feeds back the bPUCCH without the delay along with the sPUCCH. Since the sPUCCH has a latency requirement, the indication for the transmission of the sPUCCH may be generated after a time that the UE encodes UCI (uplink control information) for the bPUCCH despite a fact that the UE must firstly transmit the sPUCCH. In this way, to consider the case of only encoding the UCI for the bPUCCH without reflection of the UCI for the sPUCCH while the UE performs the bPUCCH encoding, the method P400 may be used.

The method P300 configures the UE to multiplex the bPUCCH based on the sPUCCH. In detail, when the sPUCCH (or the sPUSCH) must be transmitted based on the uplink sTTI, the UE may multiplex the base HARQ-ACK to the sPUCCH (or the sPUSCH).

The method P310 for the method P300 is a resource selection method with respect to the base HARQ-ACK bits.

The serving cell (or the serving cell eNB) may configure a resource set to the UE through the higher layer signaling. The resource set includes a plurality of resources, and the UE may dynamically select one resource among the resources included in the resource set to transmit the uplink data or the uplink control in the selected resource. A selection metric of the UE may depend on the base HARQ-ACK bit. To detect the base HARQ-ACK, the serving cell (or the serving cell eNB) may estimate which resource the UE selects.

A range defined as the resource includes at least a sequence index, a cyclic shift (CS), and the OCC, and includes a time resource and a frequency resource. The time resource may express the transmission timing by a unit of the subframe or the slot, or may also express it by the symbol index. The frequency resource may be expressed by a subband unit or an RB unit.

In the case of the sPUCCH, the range of the resource configuration includes DM-RS sequence generation information, an RB index, etc. In the case of the sPUSCH, the range of the resource configuration includes at least RB assignments.

As an example, when the base HARQ-ACK has the n bits as a maximum like [$b_0, b_1, \ldots, b_{n-1}$], the serving cell (or the serving cell eNB) may configure the $2^n$ uplink resources to the UE through the higher layer configuration.

Figure 8:
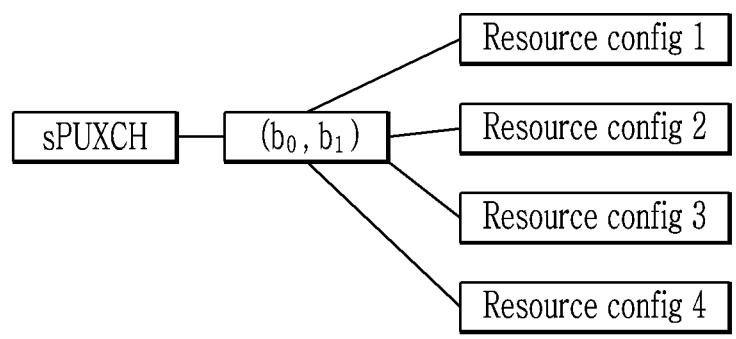
FIG. 8 is a view showing a method of multiplexing a base HARQ-ACK to an sPUCCH or an sPUSCH according to an exemplary embodiment of the present invention.

FIG. 8 is a view showing a method of multiplexing a base HARQ-ACK to an sPUCCH or an sPUSCH according to an exemplary embodiment of the present invention. FIG. 8 illustrates a case in which n is 2. In FIG. 8, the serving cell (or the serving cell eNB) performs the $2^2$ resource configurations (for example, the resource configurations 1-4) for the UE. When the base HARQ-ACK multiplexed to the sPUXCH is $b_0$ and $b_1$, the UE selects one resource among four resources and uses the selected resource as the resource of the sPUXCH.

This UE operation is similar to the method of instructing PDSCH RE mapping through a PQI (PDSCH rate matching and QuasiCoLocation indicator) field in the LTE transmission mode 10. This UE operation is similar to a 'PUCCH format 1b with channel selection' method in the LTE carrier aggregation. FIG. 8 illustrates a case of transmitting the sPUSCH and a case of transmitting the sPUCCH in the case of n=2.

This method may be applied to a case that a number of the bits of the base HARQ-ACK is small. If there is the carrier aggregation operation for the base TTI, since n is large, this method is not efficient.

The method P320 for the method P300 is a method in which the UE transmits the sPUXCH while dropping the bPUXCH and the UE transmits the bPUXCH in a next bTTI in which the UE is allowed to transmit.

The method P320 may be applied to a case that the URLLC PUXCH of the eMBB PUXCH and the URLLC PUXCH has a priority and the eMBB PUXCH is dropped or delayed. The LTE system may also give priority to the transmission of the sTTI and may postpone the transmission of the bTTI. In this case, the scheduling for the next bTTI may be overlapped.

The serving cell (or the serving cell eNB) successively allocates the bPDSCH to the corresponding UE such that a case that the UE successively transmits the bPUCCH may exist. In this way, the case that the bPUCCH is dropped in a current bTTI and the sTTI is transmitted instead may be considered. Similarly, in the case that the serving cell (or the serving cell eNB) is operated to successively transmit the bPUSCH through the corresponding UE, the bPUSCH may be dropped in the current bTTI and the sTTI may be transmitted instead. Also, when the serving cell (or the serving cell eNB) instructs the UE to successively transmit the bPUXCH without the distinguishing of the bPUSCH or the bPUCCH, the bPUXCH may be dropped in the current bTTI and the sTTI may be transmitted instead.

In this method, as the bTTI may not be successively transmitted when the sTTI is configured to transmit periodically, this method is not efficient in an aspect of throughput of the eMBB.

When the bPUSCH or the bPUCCH is also scheduled in the next bTTI, the UE may multiplex the bPUSCH (or the bPUCCH) that is dropped in the current bTTI and the bPUSCH (or the bPUCCH) to be transmitted in the next bTTI in the next bTTI.

If the bPUSCH that is dropped in the current bTTI is multiplexed with the bPUSCH in the next bTTI (a first case), it is difficult for the UE to transmit the bPUSCH without a separate instruction from the eNB. The PUSCH TPC, the PUSCH DM-RS cyclic shift, and the number of layers of the current bTTI are generally different from the PUSCH TPC, the PUSCH DM-RS cyclic shift, and the number of layers of the next bTTI, and accordingly, it is difficult to multiplex two bPUSCHs in space domain or frequency domain. Accordingly, the UE may not perform any operation for the bPUSCH that is dropped in the current bTTI.

If the bPUSCH that is dropped in the current bTTI is multiplexed with the bPUCCH in the next bTTI (a second case), under an assumption that the payload of the HARQ-ACK transmitted by the UE through the bPUCCH is small such as 1 to 2 bits, 'the PUCCH format 1b with channel selection' method (for example, the method P310) may be used. The resource of the bPUSCH is selected depending on the combination of the HARQ-ACK transmitted through the bPUCCH allocated in the next bTTI, and the UE may transmit the bPUSCH by using the selected resource in the next bTTI. The serving cell (or the serving cell eNB) may detect the bHARQ-ACK through the blind detection. To transmit the allocation information for the bPUSCH in the current bTTI, the UE may reuse the information of the UL-related DCI received from the serving cell (or the serving cell eNB). In contrast, when the payload of the HARQ-ACK transmitted in the next bTTI is large, since the combination of the HARQ-ACK exponentially increases, this method is not used. As a method to be used regardless of the payload of the HARQ-ACK, there is a method in which the UE transmits the PUSCH and the PUCCH in the next bTTI when 'a simultaneous PUSCH and PUCCH' is configured to the UE. To support this method, the UE may reuse the information of the UL-related DCI for the allocation of the PUSCH transmitted in the current bTTI.

When the bPUCCH that is dropped in the current bTTI is multiplexed with the bPUSCH in the next bTTI (a third case), under an assumption that the number of HARQ-ACK bits that are transmitted in the current bTTI is not large, the UE may select the resource of the bPUSCH to be transmitted in the next bTTI depending on the combination of the dropped HARQ-ACK. After the group of the bPUSCH resource is configured to the UE through the RRC, the serving cell (or the serving cell eNB) detects the resource of the bPUSCH received in the next bTTI from the UE through the blind detection to estimate the bit of the HARQ-ACK. In contrast, this method is not applied when the payload of the HARQ-ACK is large. As a method to be used regardless of the payload of the HARQ-ACK, there is a method in which the UE transmits the PUSCH and the PUCCH in the next bTTI when 'the simultaneous PUSCH and PUCCH' is configured to the UE.

When the bPUCCH that is dropped in the current bTTI is multiplexed with the bPUCCH in the next bTTI (a fourth case), an LTE carrier aggregation method or an LTE HARQ-ACK bundling (or the multiplexing) method may be used. As an example, there is a method using 'a PUCCH format 1b with channel selection', a method adapting the PUCCH format from a format 1a to a format 1b, or a method of performing the channel re-encoding and the RE re-mapping for the payload of the PUCCH formats 3, 4, and 5. This corresponds to a method of adaptively converting the PUCCH format, and a method of performing the channel encoding and the RE mapping by reflecting the number of HARQ-ACK bits in the same PUCCH format.

The entire payload of the HARQ-ACK to be transmitted in the next bTTI may exceed a certain PUCCH format and may use a different PUCCH format.

As such, the PUCCH format to be transmitted in the next bTTI is the format 3, however a method in which the number of HARQ-ACK bits passed from the current bTTI is large such that the PUCCH format in the next bTTI is transmitted through the format 4 may be allowed.

Figure 9A:
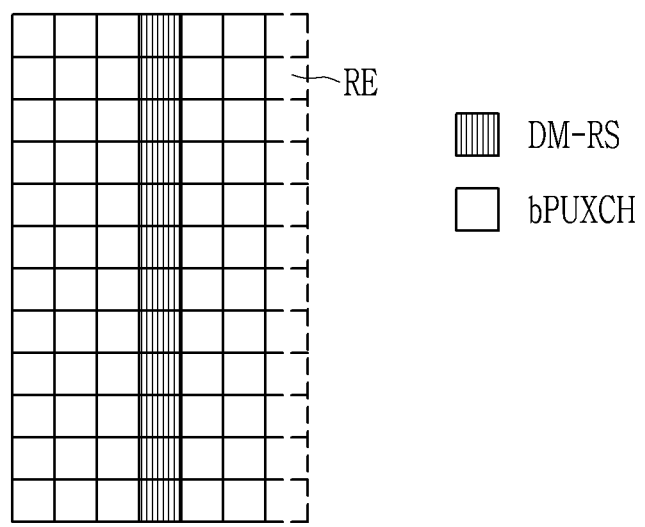
FIG. 9A, FIG. 9B, and FIG. 9C are views showing RE mapping of an sPUXCH and a bPUSCH according to an exemplary embodiment of the present invention.
Figure 9B:
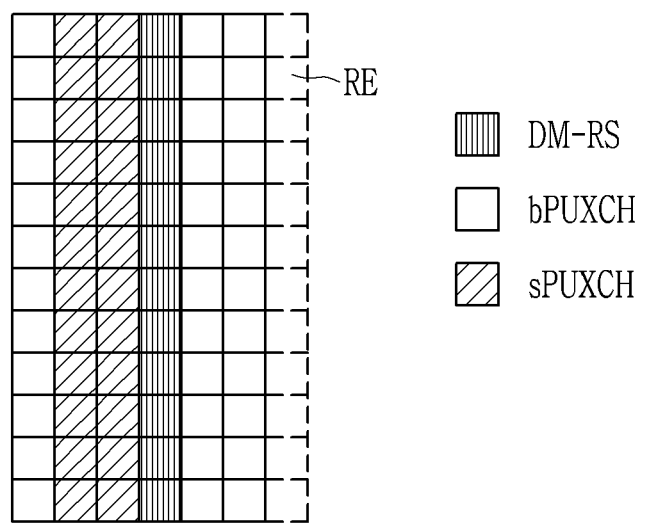
Figure 9C:
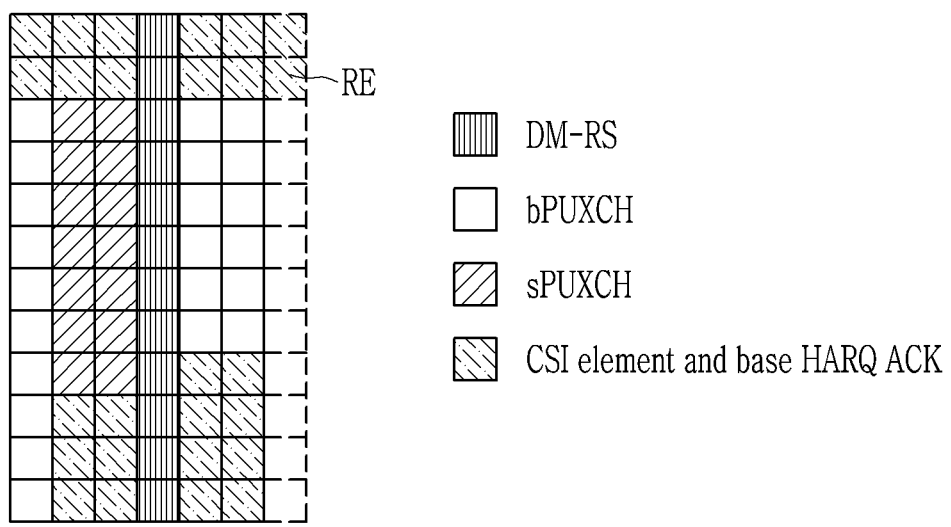

FIG. 9A, FIG. 9B, and FIG. 9C are views showing RE mapping of an sPUXCH and a bPUSCH according to an exemplary embodiment of the present invention. In detail, FIG. 9A illustrates the RE mapping of the bPUSCH, FIG. 9B illustrates the sTTI and the RE mapping of the bPUSCH, and FIG. 9C illustrates the sTTI and the RE mapping of 'bPUSCH with CSI'.

In FIG. 9A, FIG. 9B, and FIG. 9C, a transverse axis is a time axis (for example, the slot), and a longitudinal axis is a frequency axis (for example, PRB).

The method P330 for the method P300 is a method in which the UE punctures the base PUSCH and transmits the sPUXCH.

According to the method P330, the UE does not transmit the bPUSCH in the time domain symbols contained in the corresponding sTTI when the sTTI with the sPUXCH to be transmitted by the UE exists. However, the time domain symbol, which is excluded from this case (i.e., the case that the UE does not transmit the bPUSCH in the time domain symbols belonging to the sTTI), includes the DM-RS of the bPUSCH as illustrated in FIG. 9B, and the UE does not puncture the DM-RS of the bPUSCH even if the sPUXCH is transmitted.

Also, as illustrated in FIG. 9C, when the UE multiplexes the CSI element (for example, CRI (CSI-RS resource indication), RI (rank indication), PMI (pre-coding matrix indication), CQI (channel quality indication), etc.) and the base HARQ-ACK in the bPUSCH, the UE also does not puncture the CSI elements while transmitting the sPUXCH.

This method reduces the bPUXCH decoding performance of the serving cell (or the serving cell eNB) such that the retransmission procedure may be required. In the case of the bPUSCH, the UE may retransmit the bPUSCH based on the LTE PHICH or another UL grant. In contrast, in the case of the bPUCCH, even if the serving cell (or the serving cell eNB) fails the decoding, because there is no retransmission procedure, this method may not be used. The serving cell (or the serving cell eNB) may consider this case as a DTx (discontinuous transmission) of the bPDSCH and may transmit the bPDSCH through another DL assignment.

The method P340 for the method P300 is a method in which the UE rate-matches the bPUSCH and transmits the sPUXCH.

According to the method P340, the UE does not transmit the bPUSCH in the time domain symbols contained in the corresponding sTTI when the sTTI with the sPUXCH to be transmitted by the UE exists. However, the time domain symbol, which is excluded from this case (i.e., the case that the UE does not transmit the bPUSCH in the time domain symbols belonging to the sTTI), includes the DM-RS of the bPUSCH as illustrated in FIG. 9B, and the UE does not puncture the DM-RS of the bPUSCH.

Also, as illustrated in FIG. 9C, when the UE multiplexes the CSI element (for example, CRI, RI, PMI, CQI, etc.) and the base HARQ-ACK in the bPUSCH, the UE also does not puncture the CSI elements while transmitting the sPUXCH.

The UE performs the rate matching of the bPUSCH for the remaining resources except for the sTTI resource among the granted resources to increase the decoding performance of the bPUSCH. This may also be applied to the case that the serving cell (or the serving cell eNB) may not predict the transmission of the sPUXCH. Because the serving cell (or the serving cell eNB) may not predict the transmission of the sPUXCH, the UL grant of the serving cell (or the serving cell eNB) may determine the RB assignment of the bPUSCH and the MCS so as to satisfy a target BLER (for example, 10%) when the bPUSCH is transmitted by the UE in the granted resource. However, the sTTI resource is excluded in the transmission resource (the transmission resource for the bPUSCH) indicated by the UL grant of the bPUSCH received from the serving cell (or the serving cell eNB), but because the serving cell (or the serving cell eNB) may not predict whether sPUXCH is transmitted or not, the case that the serving cell (or the serving cell eNB) may not normally decode the bPUSCH may happen. In this case, the serving cell (or the serving cell eNB) must instruct the retransmission for the corresponding bPUSCH. However, in the remaining resources (or the time domain symbols) except for the sTTI resource among the bTTI resources, the UE may perform the bPUSCH RE mapping by using the granted RB assignment and the MCS.

The method P400 configures the UE for the UE to multiplex the sPUCCH based on the bPUCCH.

In the LTE, five PUCCH formats are defined. This PUCCH format is used for a CQI report or a HARQ-ACK report.

For the NR PUCCH format, methods (for example, the method P410) below may be considered.

The method P410 for the method P400 is a symbol level differential encoding method.

Firstly, the PUCCH format 1b will be described as an example.

Figure 10A:
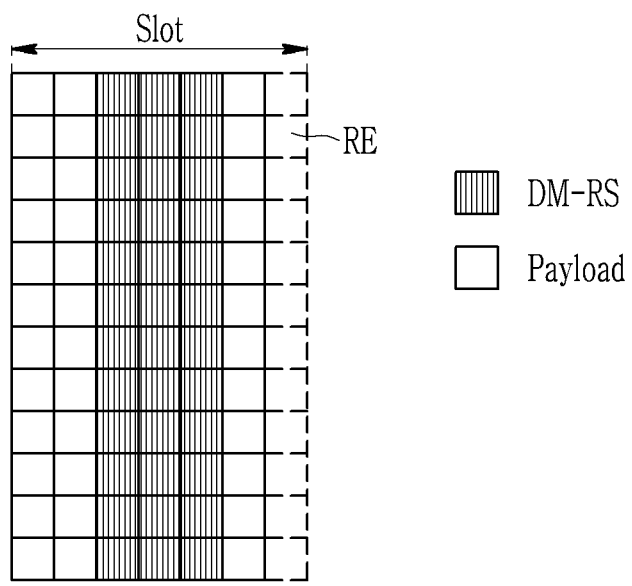
FIG. 10A and FIG. 10B are views showing a resource block of a PUCCH format 1, 1a, or 1b according to an exemplary embodiment of the present invention.
Figure 10B:
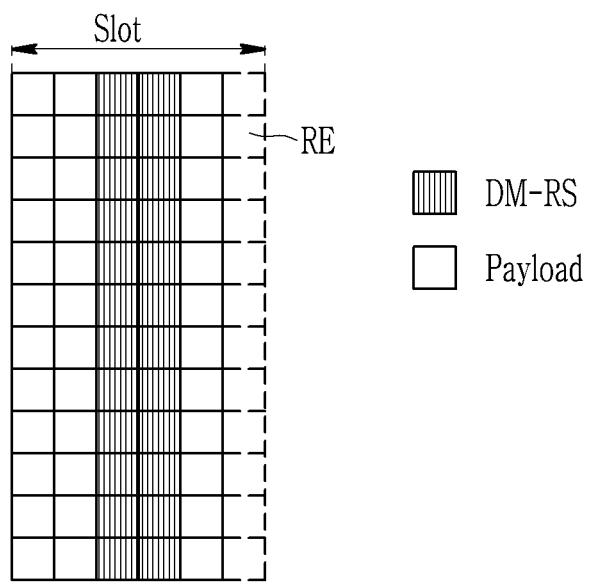

FIG. 10A and FIG. 10B are views showing a resource block of a PUCCH format 1, 1a, or 1b according to an exemplary embodiment of the present invention. In detail, FIG. 10A illustrates a case of a normal CP (cyclic prefix) and FIG. 10B illustrates an extended CP. When the shortened PUCCH format is transmitted in an even-numbered PRB, a final time domain symbol of the slot is punctured. This is applied to be the same as or similar to FIG. 9A-FIG. 9C, FIG. 10A-FIG. 10B, FIG. 11A-FIG. 11B, FIG. 12A-FIG. 12B, and FIG. 13A-FIG. 13B.

The LTE PUCCH format 1b and the normal CP are described as an example.

The resource for the LTE PUCCH format 1b includes a payload RE and a DM-RS RE. In the case of the NCP (normal CP), one slot includes seven time domain symbols (for example, SC (single carrier)-FDMA (frequency division multiple access) symbols). Among the seven time domain symbols belonging to one slot, the DM-RS is mapped to three time domain symbols and the payload is mapped to the remaining four time domain symbols.

In the case of the ECP (extended CP), one slot includes six time domain symbols (for example, SC-FDMA symbols). Among the six time domain symbols belonging to one slot, the DM-RS is mapped to two time domain symbols and the payload is mapped to the remaining four time domain symbols.

Accordingly, the channel encoding is equally applied to the case of the NCP and the case of the ECP. According to the TS 36.211, the PUCCH format 1a encodes the HARQ- ACK of 1 bit, and the PUCCH format 1b encodes the HARQ-ACK of 2 bits. Because the HARQ-ACK is expressed by 1 bit or 2 bits, the HARQ-ACK is mapped to the PUCCH payload RE through time spreading and frequency spreading for one QPSK (quadrature phase shift keying) symbol.

On the other hand, to transmit the HARQ-ACK for the PDSCH using the short TTI, the differential encoding may be applied. Hereinafter, it is assumed that the sTTI consists of two time domain symbols (for example, SC-FDMA symbols). Also, hereinafter, the base HARQ-ACK bit included in the slot 0 and the slot 1 is expressed by $[b_0, b_1]$, and the short HARQ-ACK bit included in the slot 0 and the slot 1 is expressed by $[s_0, s_1]$.

As illustrated in FIG. 10A, firstly two time domain symbols among the seven time domain symbols included in the slot 0 may be mapped through the channel coding based on $[b_0, b_1]$, however secondarily two time domain symbols among seven time domain symbols included in the slot 0 may be mapped through the channel coding based on $[b_0+s_0, b_1+s_1]$. Here, + means phase encoding.

For convenience of explanation, $b \in \mathbb{C}$ (complex number) may be expressed by the bHARQ bits, and $be^{j\phi} \in \mathbb{C}$ may be expressed by the sHARQ bits. Because the encoding process of the PUCCH format 1b assumes the frequency domain spreading using a sequence, the encoding process of the PUCCH format 1b may be expressed by $r_{f_{gh}(n_s)+f_{ss}} \in \mathbb{C}^{12\times 1}$ (vector). Here, $(f_{gh}(n_s)+f_{ss})$ is a UE-specific pseudo-random value and belongs to $\{0, \ldots, 29\}$, and $r(\ )$ expresses the sequence used by the UE in the form of the vector.

Here, $f_{gh}$ means a group-hopping pattern and is given as an equation $f_{gh}(n_s)=c(8n_s)+c(8n_s+1)2+c(8n_s+2)2^2+ \ldots +c(8n_s+7)2^7$. $f_{gh}$ is initialized every the radio frame based on the bTTI, and this initialization is expressed by $c_{int} = \lfloor n_{ID}^{PUCCH}/30 \rfloor$ or $\lfloor N_{ID}^{cell}/30 \rfloor$.

$n_{ID}^{PUCCH}$ is a number determined by the serving cell (or the serving cell eNB) for the UE and has the same range as $N_{ID}^{cell}$. $n_s$ means the slot index based on the base TTI, and $f_{ss}$ means a sequence-shift pattern.

The cyclic shift may be divided into a cell-specific cyclic shift and a UE-specific cyclic shift to be calculated. The calculation of the cyclic shift is essentially performed for interference randomization, however a calculation method and a parameter for this may directly follow the method defined by the standard of the LTE Advanced Pro as it is.

The UE may express the t-th time domain symbol (for example, the SC-FDMA symbol) as $br_{f_{gh}(n_s)+f_{ss}}(t)$ and the (t+1)-th time domain symbol (for example, the SC-FDMA symbol) as $be^{j\phi}r_{f_{gh}(n_s)+f_{ss}}(t+1)$. The serving cell (or the serving cell eNB) receives this and performs de-spreading to detect $\phi$. If the serving cell (or the serving cell eNB) detects $\phi$, $[s_0, s_1]$ may be recovered.

This method may be applied to a case that two UEs are assumed. Here, at least $n_{ID}^{PUCCH}$ or $N_{ID}^{cell}$ of the UEs is different. A case that a UE1 obtains and transmits $\phi$ in the next symbol while transmitting b and a UE2 obtains and transmits $\psi$ in the next symbol while transmitting c may be considered.

In this case, the payload transmitted by UE1 corresponds to $$(x_1(t)\ x_1(t+1))=(br_{f_{gh}(n_s)+f_{ss}}(t) be^{j\phi}r_{f_{gh}(n_s)+f_{ss}}(t+1)),$$

and the payload transmitted by the UE2 corresponds to $$(x_2(t)\ x_2(t+1))=(cs_{f_{gh}(n_s)+f_{ss}}(t)\ ce^{j\psi}s_{f_{gh}(n_s)+f_{ss}}(t+1)).$$

Accordingly, the signal received by the serving cell (or the serving cell eNB) corresponds to $Y=h_1(x_1(t)\ x_1(t+1))+h_2(x_2(t)\ x_2(t+1))+Z$. $h_1$ means an effective channel response after the UE1 combines the receiving antenna(s) of the serving cell (or the serving cell eNB). $h_2$ effective channel response after the UE2 combines the receiving antenna(s) of the serving cell (or the serving cell eNB). Z means a noise obtained in the receiving antenna of the serving cell (or the serving cell eNB). Here, the method for recovering $\phi$ is described. $\circ$ operation means an element-wise multiplication, and * operation means a complex conjugate.

Because the UE-specific spreading sequence is used, $(t)\circ r^+(t)\approx 0$ and $s(t+1)\circ r^*(t+1)\approx 0$ may be approximately used.

Therefore, an equation of $$y(t)\circ r^*(t)=h_1x_1(t)\circ r^*(t)+h_2x_2(t)\circ r^*(t)+z(t)\circ r^*(t)\approx h_1b1+z'(t)$$

and an equation of $$y(t+1)\circ r^*(t+1)=h_1x_1(t+1)\circ r^*(t+1)+h_2x_2(t+1)\circ r^*(t+1)+z(t+1)\circ r^*(t+1)\approx h_1be^{j\phi}1+z''(t+1)$$

may be obtained.

$r(\ )$ means the sequence used by the UE1 and $s(\ )$ means the sequence used by UE2. $y(\ )$ means a row vector of the signal received by the serving cell (or the serving cell eNB), $z(\ )$ means the noise received in the receiving antenna of the serving cell (or the serving cell eNB). b means the HARQ-ACK bit to be transmitted by the UE1, and 1 means the row vector made of 1. $z'(\ )$ and $z''(\ )$ mean the noise obtained after the sequence used by the UE1 is de-spread.

A value of $\phi$ may be calculated by $y(t+1)\circ r^*(t+1)/y(t)\circ r^*(t)\approx e^{j\phi}$.

The method of transmitting 2 bits belonging to the short HARQ-ACK in inter-UE interference was described.

The above-described operation is related to the mapping for one time domain symbol (for example, the SC-FDMA symbol). The method of performing the differential encoding in at least one time domain symbol belonging to the short TTI may increase the detection probability in the serving cell (or the serving cell eNB) by combining the results obtained from more time domain symbols.

If the UE places the several short HARQ-ACKs on the base PUCCH to be transmitted, TDM (time division multiplexing) may be performed by repeating this operation. Accordingly, the UE may transmit the short HARQ-ACK while maintaining the performance (for example, the detection probability, the latency requirement, etc.) of the base HARQ-ACK.

Since the UE may transmit the short. HARQ-ACK while minimizing the change of the bPUCCH for the prepared base HARQ-ACK, the complexity is low.

The above-described content corresponds to the method that may divide an ACK and a NACK of the short PUCCH. In the case of the DTx (for example, a case that the UE does not receive the DCI scheduling the PDSCH based on the short TTI), a method below may be applied.

A method P411 for the method P410 is a 'DTx-indication in phase modulation' method using phase modulation.

For generation of an $r_{f_{gh}(n_s)+f_{ss}} \in \mathbb{C}^{12\times 1}$ (vector) for the LTE PUCCH format 1b, the phase modulation is applied to the base sequence.

$$r_{f_{gh}(n_s)+f_{ss}} = r_{f_{gh}(n_s)+f_{ss}}^{(\alpha_{(p)}(n_s,l))}, \alpha_{(p)}(n_s,l) = 2\pi \cdot \frac{n_{cs}^{(p)}(n_s,l)}{N_{sc}^{RB}}.$$

$n_{cs}^{(p)}(n_s,l)$ is a function of a cell-specific parameter and a UE-specific parameter, $N_{SC}^{RB}$ means the number (for example, 12) of subcarriers configuring one PRB, $n_s$ means the slot index based on the base TTI, and I means the index of the time domain symbol. An integer multiple of the cyclic shift is applied to the corresponding sequence element index.

$$r_{f_{gh}(n_s)+f_{ss}}^{(\alpha_{(p)}(n_s,l))}(n) = \bar{r}_{f_{gh}(n_s)+f_{ss}}(n) \cdot e^{jn \cdot \alpha_{(p)}(n_s,l)}.$$

A case that the short HARQ-ACK does not exist corresponds to a case that the serving cell (or the serving cell eNB) only transmits the PDSCH in the base TTI to the UE, or a case of the DTx in which the UE fails to receive the DCI for the short TTI. The phase generation method of the LTE PUCCH format is applied as it is.

In contrast, in a case that the short HARQ-ACK exists, whether the signal of the UE is the NACK or the ACK must be expressed. For this, a method (for example, $-\alpha_{(p)}(n_s,l)$ of changing the sign of the cyclic shift may be used. The UE applies the integer multiple of the cyclic shift to the sequence element index. That is, $$r_{f_{gh}(n_s)+f_{ss}}^{(\alpha_{(p)}(n_s,l))}(n) = \bar{r}_{f_{gh}}(n_s) + f_{ss}(n) \cdot e^{jn \cdot -\alpha_{(p)}(n_s,l)}.$$

As another method, the serving cell (or the serving cell eNB) may allocate the values of the plurality of cyclic shifts to the UE, the UE may select a certain cyclic shift value among the plurality of cyclic shift values in the case of the ACK, and may select the other certain cyclic shift value in the case of the NACK, and may apply the selected cyclic shift value to the corresponding sequence element index.

The serving cell (or the serving cell eNB) detects the sequence element (or the frequency domain spreading sequence) through blind detection to firstly determine whether the UE corresponds to the DTx or not. When the serving cell (or the serving cell eNB) determines whether the corresponding UE corresponds to the DTx, it is determined whether the signal of the UE is the ACK or the NACK by using the method P410.

A method P412 for the method P410 is a 'DTx-indication in sequence index domain' method using the sequence index.

The base sequence index used for the LTE PUCCH is determined based on group hopping ($f_{gh}(n_s)$) and sequence shift ($f_{ss}$). The sequence index used for the DM-RS and the sequence index used for the payload are the same. When the sTTI (or a subslot $m_s$) is introduced, the sequence index may be generated from $m_s$. Accordingly, in a case of a non-DTx in which the UE must transmit the short HARQ-ACK, the sequence index used for the corresponding subslot is different from the sequence index used for the base HARQ-ACK. The serving cell (or the serving cell eNB) detects the sequence index through the blind detection to firstly determine whether the UE experiences the DTx. When the serving cell (or the serving cell eNB) determines that the UE does not experience the DTx, it is determined whether the signal of the corresponding UE is the ACK or the NACK by using the method P410.

Next, the PUCCH format 3 will be described as an example.

The LTE PUCCH format 3 is also encoded similar to the PUCCH format 1b, however the LTE PUCCH format 3 considers the time domain spreading and does not consider the frequency domain spreading. The symbol level differential encoding for the PUCCH format 3 may be performed similarly to the symbol level differential encoding for the PUCCH format 1b. However, because the PUCCH format 3 does not consider the frequency domain spreading, the inter-UE interference is generated, and if the amount of the interference suffered in the time domain symbol period in which the serving cell (or the serving cell eNB) receives the PUCCH format 3 is changed, the receiving performance of the PUCCH format 3 of the serving cell (or the serving cell eNB) is reduced.

Figure 11A:
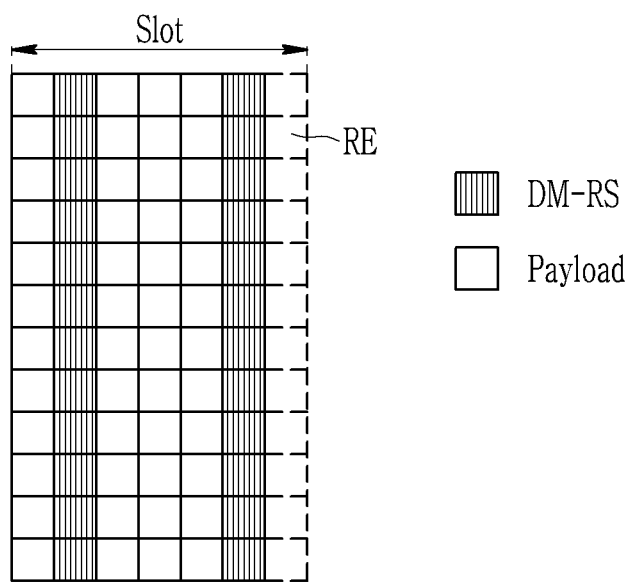
FIG. 11A and FIG. 11B are views showing a resource block of a, LTE PUCCH format 3 according to an exemplary embodiment of the present invention.
Figure 11B:
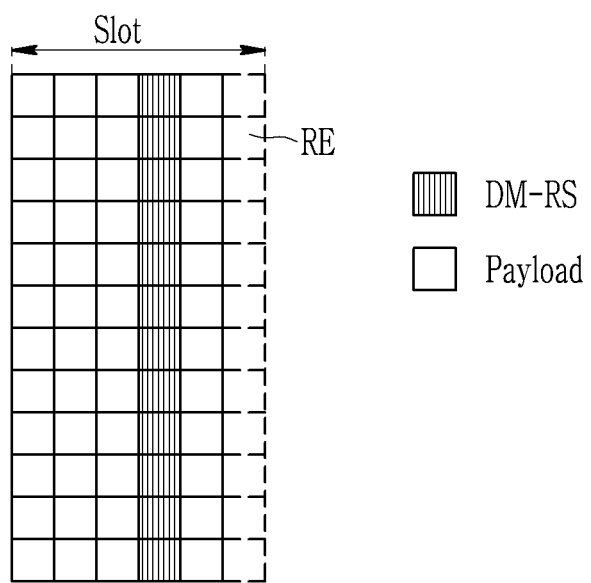

FIG. 11A and FIG. 11B are views showing a resource block of an LTE PUCCH format 3 according to an exemplary embodiment of the present invention. In detail, FIG. 11A illustrates the case of the normal CP, and FIG. 11B illustrates of the case of the extended CP.

If the slot index to which the PRB belongs is an odd number (for example, slot 1) and the shortened format for the simultaneous transmission with the SRS is configured, the final time domain symbol is not transmitted. This is applied to be the same as or similar to FIG. 9A-FIG. 9C, FIG. 10A-FIG. 10B, FIG. 11A-FIG. 11B, FIG. 12A-FIG. 12B, and FIG. 13A-FIG. 13B.

When the value of the RE having the LTE PUCCH format 3 is expressed as $y_n^{(p)}(i)$, p represents a logical index (for example, 0, 1, 2, 3, etc.) of the antenna port, n represents the index of the time domain symbol (for example, the SC-FDMA symbol), and i represents the subcarrier index. $N_0$ corresponds to 5 in the case of the normal PUCCH format 3 and corresponds to 4 in the case of the shorted PUCCH format 3. d(i) means the encoded) HARQ-ACK bit.

$$n_{cs}(n_s,l) = 2^0 \cdot c(8N_{symb} \cdot n_s + 8l + 0) + 2^1 \cdot c(8N_{symb} \cdot n_s + 8l + 1) + 2^2 \cdot c(8N_{symb} \cdot n_s + 8l + 2) + \ldots + 2^7 \cdot c(8N_{symb} \cdot n_s + 8l + 7)$$

$n_{cs}(\ )$ means the cyclic shift, and C() means the pseudo-random sequence used in the LTE. $N_{symb}$ corresponds to 7 in the case of the normal CP and corresponds to 6 in the case of the extended CP.

$w_{n_0}^{(p)}(\cdot)$ and $w_{n_1}^{(p)}(\cdot)$ are time domain orthogonal sequences, correspond to a length-5 DFT sequence in the case of the normal PUCCH format 3, and correspond to a length-4 DFT sequence in the case of the shortened PUCCH format 3.

$$y_n^{(p)}(i) = \begin{cases} w_{n_0^{(p)}}(n) \cdot \exp\left(j2\pi\left\{\dfrac{\left\lfloor\dfrac{n_{cs}(n_s,l)}{64}\right\rfloor}{4} + \dfrac{i \cdot m_{cs}(n_s,l)}{N_{sc}^{RB}}\right\}\right) \cdot d(i) & 1 \leq n < N_0 \\ w_{n_1^{(p)}}(n) \cdot \exp\left(j2\pi\left\{\dfrac{\left\lfloor\dfrac{n_{cs}(n_s,l)}{64}\right\rfloor}{4} + \dfrac{i \cdot m_{cs}(n_s,l)}{N_{sc}^{RB}}\right\}\right) \cdot d(i + N_{sc}^{RB}) & N_0 \leq n \end{cases}$$

The method according to an exemplary embodiment of the present invention changes UE-specifically the cyclic shift by adding $m_{cs}(n_s,l)$ to each subcarrier index i for the calculation of $y_n^{(p)}(i)$. Accordingly, the effect of the frequency domain spreading can be obtained, and an inter-cell interference can be mitigated.

Because the case without considering the mixed format is $N_{cs}=0$, $m_{cs}(n_s,l)$ may be obtained through the normalization of the UE-specific value. According to the LTE PUCCH format 1b, $m_{cs}(n_s,l)$ may be obtained as in the equation below.

$$m_{cs}(n_s,l) = (n'_{(p)}(n_s) \cdot \Delta + n_{oc}^{(p)}(n_s) \bmod \Delta) \bmod N_{sc}^{RB}$$

Here, the serving cell (or the serving cell eNB) configures Δ through the higher layer configuration to the UE, and Δ has one value among 1, 2, and 3. c is 2 in the case of the normal CP and is 1 in the case of the extended CP.

$$n'_{(p)}(n_s) = n^{(3,p)} \mathrm{mod}\left(\frac{c \cdot N_{sc}^{RB}}{\Delta}\right)$$

$$n_{oc}^{(p)}(n_s) = \begin{cases} \left\lfloor \frac{n'_{(p)}(n_s) \cdot \Delta}{N_{sc}^{RB}} \right\rfloor & \text{if } n_s \text{ is even} \\ -1 + \left[c \cdot \{1 + n'_{(p)}(n_s - 1)\} \mathrm{mod}\left(1 + \frac{c \cdot N_{sc}^{RB}}{\Delta}\right)\right] & \text{if } n_s \text{ is odd} \end{cases}$$

The serving cell (or the serving cell eNB) configures $n^{(3,p)}$ through the higher layer configuration to the UE. Here, c means the number of DM-RS symbols used for the PUCCH format 3.

The method P420 for the method P400 is the PUCCH rate matching method.

Compared with the case in which the above-described base PUCCH is spread, a case without considering the spreading of the base PUCCH may be considered. In this case, to transmit the short HARQ-ACK, the channel coding of the multiplexing of the resource mapping may not be considered, and the multiplexing of the short PUCCH may be considered.

The PUCCH format 4 will be described as an example.

For example, the LTE PUCCH format 4 has a form of the PUSCH. A spreading factor of 1 is used, and at least one RB may be used depending on the RRC configuration. Accordingly, the serving cell (or the serving cell eNB) may more configure the frequency resource of the PUCCH format 4 for the multiplexing of the short PUCCH resource. As a method informing this configuration to the UE, a transmission mode configuration and a report configuration may be used in a case that the serving cell (or the serving cell eNB) uses several TTIs to service the eMBB and the URLLC.

Figure 12A:
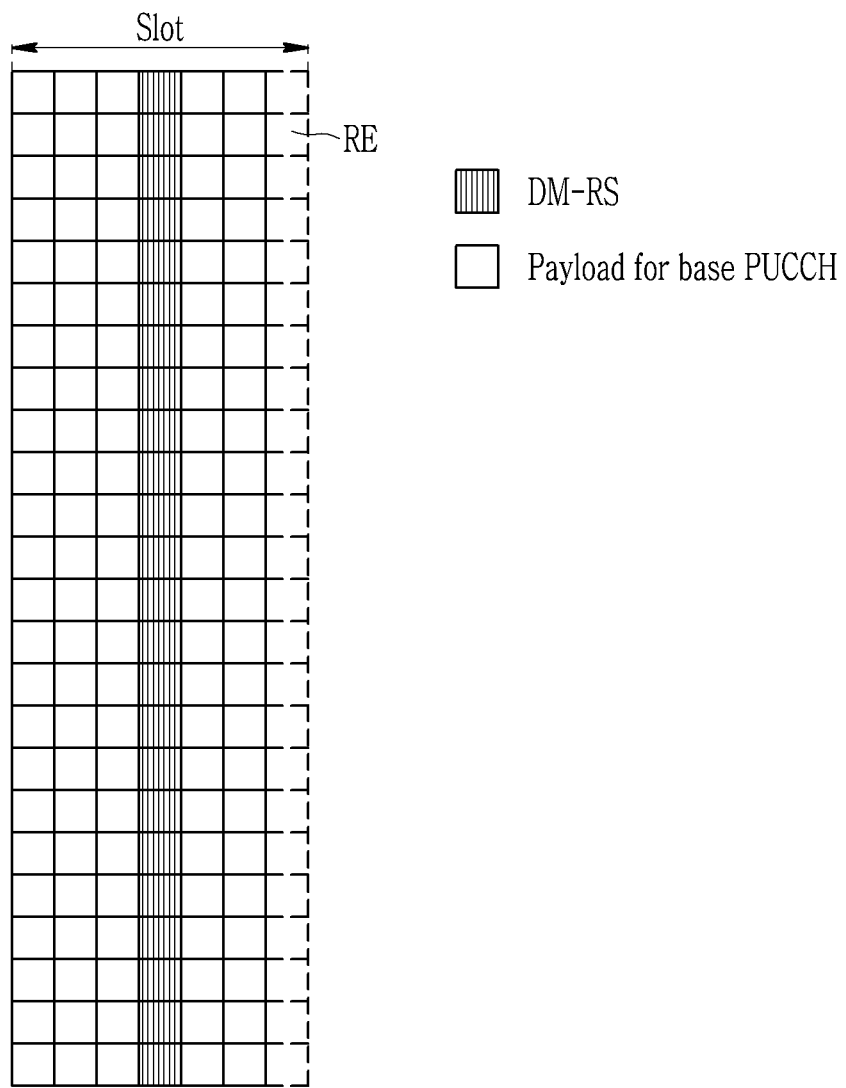

These methods are illustrated in FIG. 12A and FIG. 12B.

FIG. 12A and FIG. 12B are views showing a slot of an LTE PUCCH format 4 of a case that a normal CP is used according to an exemplary embodiment of the present invention. In detail, FIG. 12A illustrates the base PUCCH slot, and FIG. 12B illustrates the slot in which the base PUCCH and the short PUCCH are multiplexed.

In FIG. 12A and FIG. 12B, the horizontal axis is the time axis (for example, the slot), and the vertical axis is a frequency axis (for example, the configured bandwidth).

The base HARQ-ACK uses the PUCCH format 4. Two short HARQ-ACKs are generated such that two short PUCCHs corresponding thereto are illustrated in FIG. 12B.

FIG. 12A and FIG. 12B illustrate a case in which the DM-RS is mapped in the 4th time domain among the seven time domain symbols (for example, the SC-FDMA symbol) included in the slot.

It is assumed that the short PUCCH is configured so as to satisfy a detection probability and a false alarm probability required by the serving cell (or the serving cell eNB) through the encoding and spreading of the HARQ-ACK.

In the short PUCCH, the channel coding such as a Reed-Muller code, a TBCC (tail-biting convolutional code), a turbo code, a polar code, etc. may be applied.

As illustrated in FIG. 12A and FIG. 12B, the short PUCCH may be transmitted alone by the UE or may be multiplexed with the base PUCCH to be transmitted. For each case, the short PUCCH may have a channel encoding scheme and an encoding rate (also the RE mapping) that are different from the base PUCCH.

As illustrated in FIG. 12A and FIG. 12, the base PUCCH and the short PUCCH share the DM-RS. Also, for the short PUCCH to utilize the frequency diversity, the RE mapping using the several subcarriers that are not adjacent is performed.

For the base PUCCH, the RE to be usable by the short PUCCH is emptied and the PUCCH rate matching is performed, thereby performing the RE mapping.

To obtain the detection probability of the short PUCCH, the UE may perform the transmission power control for each time domain symbol (for example, an SC-FDMA symbol). In this case, the serving cell (or the serving cell eNB) may transmit the power offset to be usable by the UE through the higher layer signalling or the physical layer signalling to the UE.

The method P430 for the method P400 is the OCC selection method.

The base PUCCH may spread the adjacent payloads REs through the OCC. In this case, the serving cell (or the serving cell eNB) may configure the several OCC sets to the UE, and the UE may transmit the HARQ-ACK bit for the short PUCCH to the serving cell (or the serving cell eNB) by using the different OCCs from each other depending on the HARQ-ACK bit for the short PUCCH. Because this approach allocates the OCC to the payload instead of orthogonalizing the inter-UE interference by using the OCC, the UE multiplexing capability is small.

The PUCCH format 5 will be described as an example.

The serving cell (or the serving cell eNB) configures the OCC-2 (length 2 OCC) used by the UE through the higher layer signalling to the UE. The PUCCH format 5 spreads one encoded PUCCH RE into two REs with one DM-RS symbol in the frequency domain.

Figure 13A:
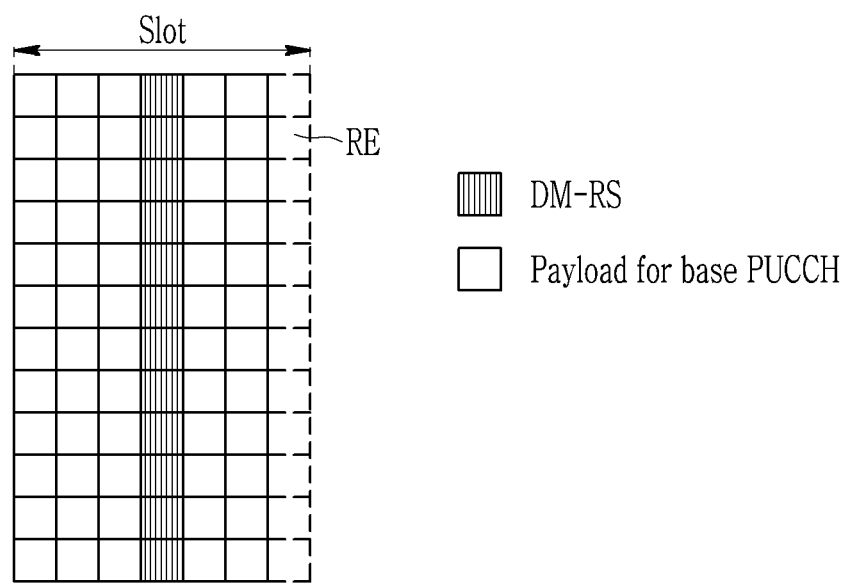
FIG. 13A and FIG. 13B are views showing a slot of an LTE PUCCH format 5 of a case that a normal CP is used according to an exemplary embodiment of the present invention.
Figure 13B:
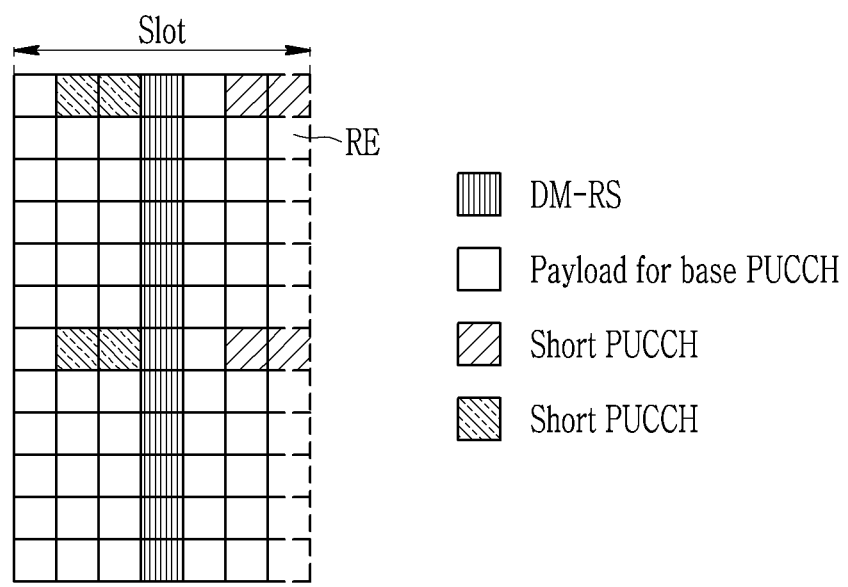

FIG. 13A and FIG. 13B are views showing a slot of an LTE PUCCH format 5 of a case that a normal CP is used according to an exemplary embodiment of the present invention. In detail, FIG. 13A illustrates the base PUCCH slot, and FIG. 13B illustrates the slot in which the base PUCCH and the short PUCCH are multiplexed. FIG. 13A illustrates only the base PUCCH, and FIG. 13B illustrates an RE pair applied with the OCC. It is assumed that there are two short TTIs.

The serving cell (or the serving cell eNB) does not configure the OCC-2 to the UE, and the UE may dynamically select and determine the OCC-2. In this case, the UE may apply the frequency domain spreading to [+1, +1] or apply the frequency domain spreading to [+1, −1] depending on the HARQ-ACK bit for the short PUCCH. Since there are six subcarriers, the detection performance of the HARQ-ACK bit for the short PUCCH may be maintained as high as possible. In the TS 36.211, $n_{oc}$ is configured to the UE through the higher layer signalling. However, in the method according to an exemplary embodiment of the present invention, the UE may determine $n_{oc}$ representing the index of the OCC-2 and the serving cell (or the serving cell eNB) may detect $n_{oc}$ through the blind detection to determine whether $n_{oc}$=0 or 1.

This method may be applied to intra-cell inter-UE interference, but has a drawback that it is weak to the inter-cell inter-UE interference. To solve this, a method of increasing the frequency domain spreading factor may be used. Through this method, the TS may further variously define the frequency domain OCC. The UE may select the frequency domain OCC depending on the combination of the HARQ-ACK bit(s) for the short PUCCH. The UE may generate the base PUCCH format to which the selected OCC is applied, and may indirectly transmit the HARQ-ACK bit for the short PUCCH to the serving cell (or the serving cell eNB).

The method P500 is the puncturing method.

Figure 14A:
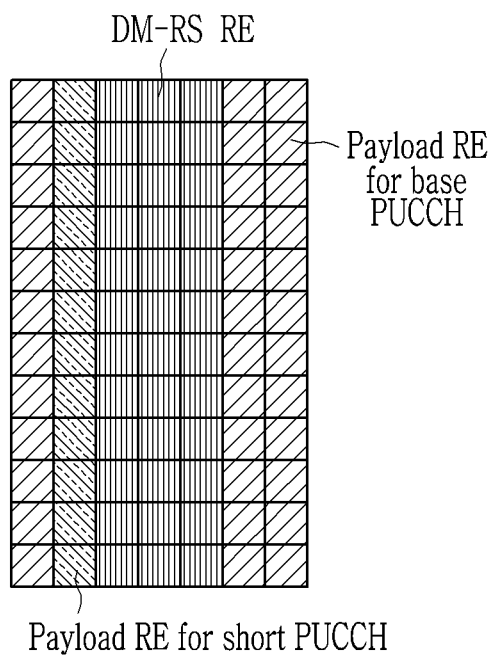
FIG. 14A and FIG. 14B are views showing puncturing of a short PUCCH according to an exemplary embodiment of the present invention.
Figure 14B:
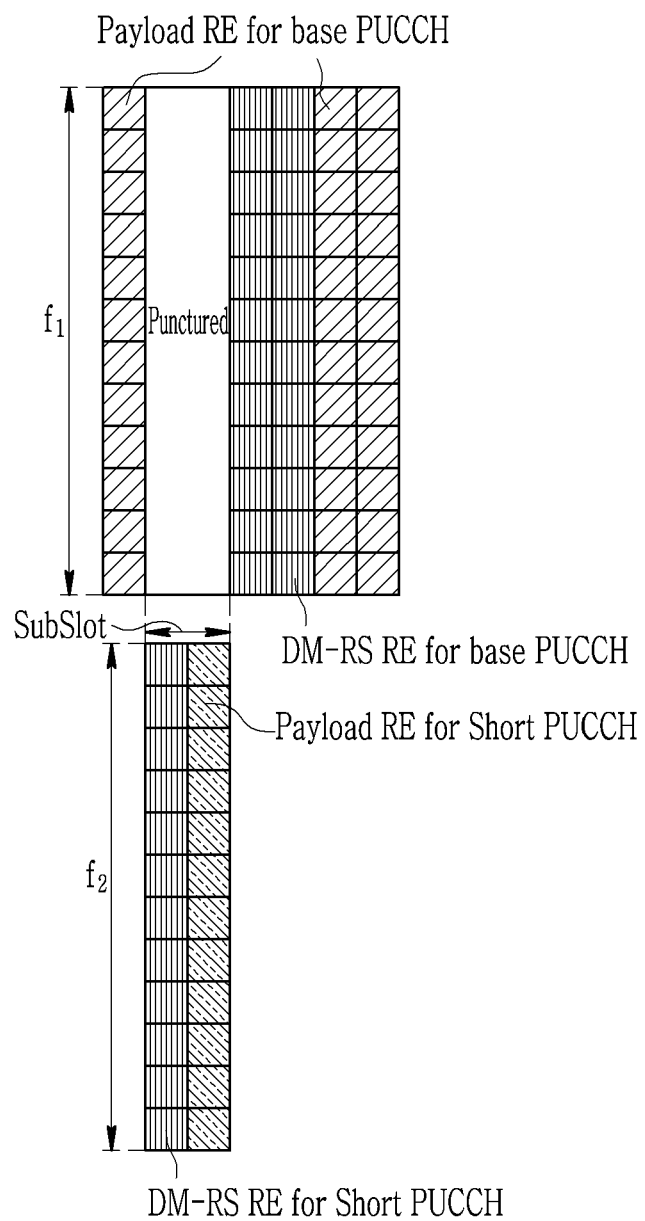

The method P500 does not transmit the bPUCCH in the specific UL subslot in the UL symbols in which the bPUCCH is transmitted, and transmits the sPUCCH. This method is illustrated in FIG. 14A and FIG. 14B. FIG. 14B illustrates the case that the subslot includes two time domain symbols.

FIG. 14A and FIG. 14B are views showing puncturing of a short PUCCH according to an exemplary embodiment of the present invention. In detail, FIG. 14A illustrates 'bPUCCH puncturing with DM-RS sharing' sharing the DM-RS, and FIG. 14B illustrates 'bPUCCH puncturing with separate DM-RS' without sharing the DM-RS.

The method P330 restricts the puncturing pattern or the rate matching to the specific time domain symbols and the specific subcarrier, however the method P500 applies a puncturing pattern to all subcarriers belonging to the specific time domain symbol.

In FIG. 14A and FIG. 14B, for convenience of description, the RE mapping of the LTE PUCCH format 1b representing an arbitrary base PUCCH is assumed. FIG. 14A illustrates a case that the sPUCCH and the bPUCCH share the DM-RS. FIG. 14B illustrates a case that the sPUCCH and the bPUCCH do not share the DM-RS.

In the case that the sPUCCH does not puncture the DM-RS of the bPUCCH and shares it with the bPUCCH (for example, FIG. 14A), because the number of DM-RS symbols or DM-RS REs is sufficient, channel estimation for a bandwidth transmitting the payload of the corresponding base PUCCH and the time domain symbol may be correctly performed.

In contrast, in the case that the sPUCCH and the bPUCCH does not share the DM-RS with each other (for example, FIG. 14B), an additional DM-RS for the sPUCCH must be allocated. Because the sPUCCH and the bPUCCH generally have different frequency resources (for example, $f_1$, $f_2$), the sPUCCH and the bPUCCH may not share the DM-RS with each other. Accordingly, the number of DM-RS symbols or DM-RS REs to be used for the channel estimation by the serving cell (or the serving cell eNB) receiving the sPUCCH and the bPUCCH is relatively reduced. Accordingly, the puncturing may be performed to replace a portion of bPUCCH by the sPUCCH, but sPUCCH and bPUCCH share the same DM-RS with the shape illustrated in FIG. 14A.

In the case of the LTE, the format 1 PUCCH resource index (for example, n) is defined as a function (for example, $n=n^1+n_{CCE}$) of a higher layer configured parameter (for example, $n^1$) and a dynamically signalled parameter (for example, $n_{CCE}$). If the same mechanism is also applied to the NR, the frequency resource to transmit the sPUCCH through the UE is different depending on the value determined by the sPDCCH. In the present description, the PDXCH means the PDCCH or the PDSCH. The sPDXCH (short PDXCH) is transmitted in the time domain symbol of a relatively high number compared with the bPDXCH (base PDXCH), thereby being transmitted during a longer time period. Also, the sPDXCH (short PDXCH) has lower subcarrier spacing compared with the bPDXCH (base PDXCH), however it is transmitted in the time domain symbol of the same number, thereby being transmitted during the longer time period.

As described above, because the UE transmits the additional DM-RS for sPUCCH, the number of time domain symbols punctured in the bPUCCH to incorporate the DM-RS for the sPUCCH is further increased, or conversely the number of time domain symbols occupied with the payload of the sPUCCH is reduced. When the sPUCCH and the bPUCCH share the DM-RS, this drawback may be resolved.

In this case, the serving cell (or the serving cell eNB) may perform the demodulation when both bPUCCH and sPUCCH are allocated in the same frequency resource occupied with the DM-RS. To transmit the sPUCCH which is suddenly generated while the UE transmits the bPUCCH, the dynamically signalled parameter used in the sPUCCH resource index may be derived from the bPDCCH rather than the sPDCCH.

Next, the case that the sPUCCH and the bPUCCH share the DM-RS will be described in detail.

The format 1b will be described as an example.

Hereinafter, for convenience of description, the base HARQ-ACK transmitted by the bPUCCH is referred to as $d_0 \in \mathbb{C}$, and the HARQ-ACK symbol for the short PUCCH is referred to as $d_i \in \mathbb{C}$, i=1, 2, 3, . . . . Each complex number corresponds to 2 bits. Assuming that bPUCCH is in the form of the LTE PUCCH format 1b, the bPUCCH has three DM-RS symbols and four payload symbols (for example, the time domain symbol for the payload). Accordingly, when only the bPUCCH exists and the sPUCCH does not exist, the UE respectively spreads [$d_0$, $d_0$, $d_0$, $d_0$] in each UL symbol like LTE. When the UE should transmit the HARQ-ACK bit by using the sPUCCH, the UE must allocate at least one UL symbol to the HARQ-ACK bit for the bPUCCH to together transmit the HARQ-ACK bit for the bPUCCH. Therefore, the UE may transmit at most three HARQ-ACK symbols (or up to six bits) to be transmitted through the sPUCCH within one PRB that is allocated for the bPUCCH.

Four HARQ-ACK symbols to be transmitted through the sPUCCH by the UE may be transmitted through the puncturing of the bPUCCH within one PRB that is allocated for the bPUCCH based on the PUCCH format 1b. For this, because five or more HARQ-ACK symbols (for example, four or more HARQ-ACK symbols to be included in the sPUCCH and an additional one base HARQ-ACK symbol) must be transmitted, the source encoding or the channel encoding must be used. This is not appropriate for the URLLC scenario in which the sPUCCH can be suddenly transmitted, and is appropriate for the carrier aggregation scenario or the dual connectivity scenario, in which the UE may predict in advance the existence of the HARQ-ACK bit using the short PUCCH.

If the URLLC scenario is considered, when a total of four or less HARQ-ACK symbols including the three or less HARQ-ACK symbols for short PUCCH are transmitted, averagely one HARQ-ACK symbol may be allocated to one UL symbol among four HARQ-ACK symbols. That is, a case in which the HARQ-ACK symbol for the short PUCCH should be transmitted in the 3-th bPUCCH payload symbol among total four payload symbols may be expressed by [$d_0$, $d_0$, $d_1$, $d_0$]. A case in which the HARQ-ACK for the short PUCCH should be transmitted in the 2nd, 3rd, and 4th bPUCCH payload symbols among four payload symbols corresponds to a case that the serving cell (or the serving cell eNB) continuously performs the scheduling assignment for the short PDSCH to the UE three times and may be expressed by [$d_0$, $d_1$, $d_2$, $d_3$].

The UE performs the encoding by using the HARQ-ACK bits determined as above-described when generating the bPUCCH payload symbol. The serving cell (or the serving cell eNB) receives the bPUCCH to detect $d_0$ and $d_i$ (where i=1, 2, . . . ).

If the UE fails after receiving the sPDCCH, because the UE does not recognize the sPDSCH, the HARQ-ACK $d_i$ (where i>0) thereof may not be transmitted and the HARQ-ACK $d_0$ is transmitted. In this case, the serving cell (or the serving cell eNB) may not distinguish whether the HARQ-ACK received in the period of the sTTI corresponds to the part of the bPUCCH (i.e., corresponds to the DTx) or the part of the short PUCCH. In detail, if the UE does not receive the sPDCCH, because the UE has the information for $d_i$, $d_0$ must be transmitted. In this case, even if the serving cell (or the serving cell eNB) performs the QPSK demodulation in the UL symbol, it may be confirmed whether the demodulated HARQ-ACK is the HARQ-ACK (for example, $d_0$) for the base PDSCH or the HARQ-ACK (for example, $d_i$) for the sPDSCH. As an example, in the case of $d_0=(1+j)/sqrt(2)$, and $d_i=(1-j)/sqrt(2)$, since the values of $d_0$ and $d_i$ are different, the serving cell (or the serving cell eNB) may consider that the UE normally receives the sPDCCH. However, in the case of $d_0=d_i$, the serving cell (or the serving cell eNB) may not confirm whether the UE normally receives the sPDCCH.

Also, in the case that the UE transmits the HARQ-ACK bit for the sPUCCH as well as bPUCCH while using the OCC, the value of the time domain symbol is punctured and changed. Accordingly, the time domain multiplexing capability obtained by the serving cell (or the serving cell eNB) is reduced.

The method P510 for the method P500 is a 'DTx detection by subslot index scrambling' method.

The sequence index for the LTE PUCCH is determined based on group hopping ($f_{gh}(n_s)$) and a sequence shift ($f_{ss}$). The sequence index used for the DM-RS and the sequence index used for the payload are the same. If the sTTI (or the subslot $m_s$) is introduced, the sequence index may be generated by using $m_s$ as the parameter. Accordingly, in the case of a non-DTx in which the UE must transmit the HARQ-ACK bit using the sPUCCH, the sequence index used in the corresponding subslot may be defined to be different from the sequence index used for the HARQ-ACK bit using the base PUCCH. The serving cell (or the serving cell eNB) detects the sequence index applied to the corresponding sTTI (or the subslot $m_s$) in the received bPUCCH through the blind detection to determine whether the UE corresponds to the DTx or the non-DTx. That is, the serving cell (or the serving cell eNB) may distinguish whether the HARQ-ACK received in the corresponding sTTI is $d_0$ or $d_i$ (where i>0).

However, because the number of PUCCH payload symbols allocated to $d_0$ by the UE is reduced as $d_i$ (where i>0) is increased, the coverage of the bPUCCH is reduced.

A method P520 for the method P500 is an 'sPUCCH by sequence selection' method.

The method P520 is a method in which the sequence index is allocated to the UE as the resource and the HARQ-ACK symbol for the corresponding short PUCCH is detected by detecting the sequence index from the bPUCCH received from the serving cell (or the serving cell eNB). The HARQ-ACK symbol for the sPUCCH supported by one subslot is generated from two bits, and accordingly the UE may determine the sequence index among four cases.

The LTE PUCCH determines the sequence index based on ($f_{gh}(n_s)+f_{ss}$) mod 30. Here, an offset ($\Delta_{ss}$) applied to the HARQ-ACK bit for the short PUCCH may be additionally introduced. As an example, the UE may derive the sequence index to be used in the corresponding subslot $m_s$ based on ($f_{gh}(m_s)+f_{ss}+\Delta_{ss}$)mod 30. The value of the possible offset may consist of four natural numbers and may be defined by a function (for example, $\Delta_{ss}(m_s)$) of $m_s$ for interference randomization.

Through this method, the serving cell (or the serving cell eNB) may detect the sequence index by using a cross correlation to indirectly detect the HARQ-ACK symbol. Also, because the sequence index may be different from the sequence index used for the base PUCCH payload symbol, the serving cell (or the serving cell eNB) may determine whether the DTx occurs or not. If $d_0$ is applied to this generated sequence by the UE, because the base HARQ-ACK may use four payload symbols effectively, most of the coverage of the bPUCCH may be maintained. However, the coverage of the bPUCCH may be slightly reduced depending on residual interference from the interference randomization processing.

Only the base sequences having high cross correlation performance may be selected. As an example, only some of indexes are selected among thirty base sequences allowed for the LTE PUCCH. If, to transmit the k short HARQ-ACK cases (for example, k=1, 2, 3, 4), the sequence index set may be determined such that the cross correlation between those k sequences is small. In the case of the LTE, a norm of a pairwise cross correlation for three length-12 sequences may be two, and an autocorrelation may correspond to 12.

Even if the sequence index of the bPUCCH payload and the sequence index of the sPUCCH payload are the same, because the cyclic shift used by the UE is different for each UE, the serving cell (or the serving cell eNB) may easily determine the DTx and the intra-cell interference may also be randomized. If the different UEs transmit the same sequence in the same subslot to the serving cell (or the serving cell eNB), the serving cell (or the serving cell eNB) may distinguish one UE by using only the UE-specific cyclic shift.

In other words, by considering a noiseless case, a received signal of the n-th subcarrier may be expressed by $$y(n)=d_u \cdot r(n)e^{j\phi_u(n)}+d_v \cdot r(n)e^{j\phi_v(n)}.$$

Here, $d_u$ and $d_v$ represent the HARQ-ACK symbol, $r(n)$ represents the sequence element corresponding to the n-th subcarrier, and $\phi_u(n),\phi^v(n)$ represents the UE-specific cyclic shift. To detect $d_u$, $$\frac{y(n)}{r(n)} / e^{j\phi_u(n)} = d_u + d_v e^{j[\phi_v(n)-\phi_u(n)]}$$

may be calculated. If an addition for the subcarrier n to detect $d_u$ is performed, an amount of the residual interference is proportional to the norm of $$\sum_n e^{j[\phi_v(n)-\phi_u(n)]}.$$

If the difference of the UE-specific cyclic shift is sufficiently random, the norm of the corresponding value is not large compared to 1. Accordingly, since the amount of the residual interference is not large, the coverage that the transmission of $d_u$ reaches is not much affected by $d_v$.

If the method P521 for the method P520 is used, the UE may determine the sequence index based on the ($f_{gh}(n_s)+f_{ss}$) mod 30 like the LTE PUCCH, and may differently determine the cyclic shift value used in the specific subslot $m_s$. Depending on the HARQ-ACK symbol to be transmitted by using the short PUCCH, the UE may select the cyclic shift value to generate the UL symbol belonging to the subslot. The serving cell (or the serving cell eNB) may detect the cyclic shift value applied to the subslot $m_s$ to estimate the value of the HARQ-ACK symbol.

A modified PUCCH format 1b will be described as an example.

FIG. 14A illustrates a case that the DM-RS symbol index for the LTE PUCCH format 1b is equally used and the sPUCCH and the bPUCCH share the DM-RS. As another example of FIG. 14A, a case that the DM-RS symbol index of the base PUCCH is differently used is illustrated in FIG. 15.

Figure 15:
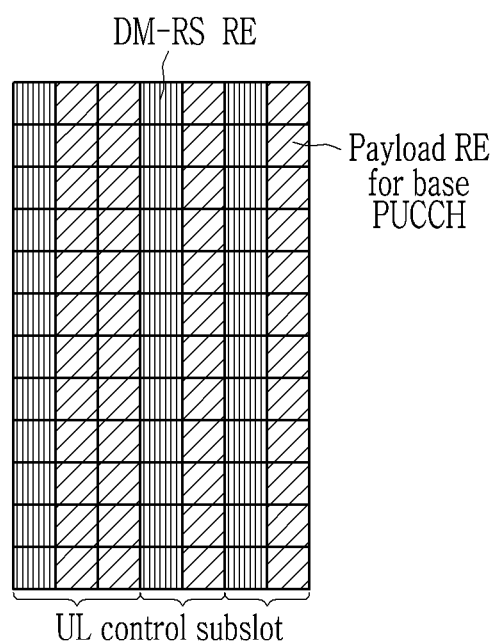
FIG. 15 is a view showing a case that a UL control subslot consists of three in a base PUCCH having seven UL symbols according to an exemplary embodiment of the present invention.

FIG. 15 is a view showing a case that a UL control subslot consists of three in a base PUCCH having seven UL symbols, and each UL control subslot consists of three, two, and two UL symbols (that is, 3, 2, and 2) according to an exemplary embodiment of the present invention.

The UL slot consists of seven UL symbols, and the UL slot includes three UL control subslots. Three UL control subslots belonging to the UL slot may be represented by (3, 2, 2). Among three UL control subslots, a first subslot (UL control subslot1) includes three time domain symbols, a second control subslot (UL control subslot2) includes two time domain symbols, and a third subslot (UL control subslot3) includes two time domain symbols. The UL control subslot1 includes two payload symbols, and the UL control subslot2 and the UL control subslot3 include one payload symbol. Alternatively, the UL slot may be configured differently. As an example, the UL slot may be configured like (2, 3, 2) or (2, 2, 3), and a method to be described may be equally applied in this case.

When the UL slot is configured as (3, 2, 2) as illustrated in FIG. 15, because the DM-RS is transmitted in the first UL symbol among seven UL symbols belonging to the UL slot, the gNB (or the eNB) may finish the channel estimation at an earlier point in time. Accordingly, the demodulation latency of the UL control channel may be reduced.

Figure 16A:
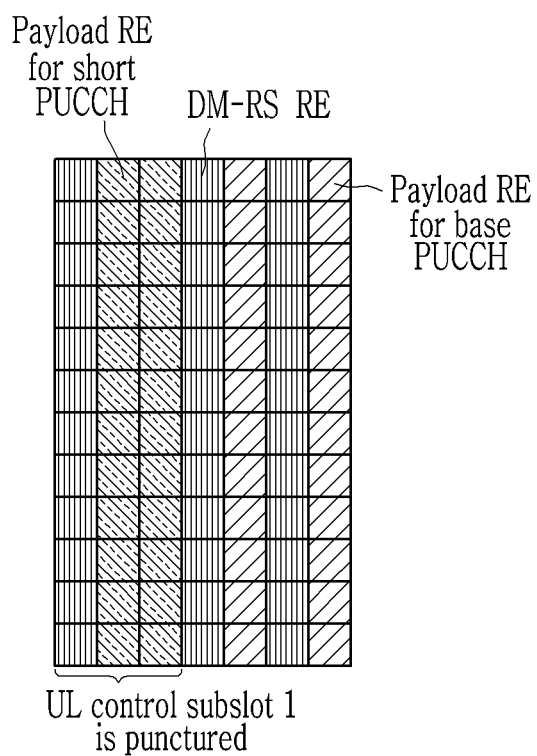
FIG. 16A and FIG. 16B are views showing a case that a base PUCCH is punctured through one short PUCCH according to an exemplary embodiment of the present invention.
Figure 16B:
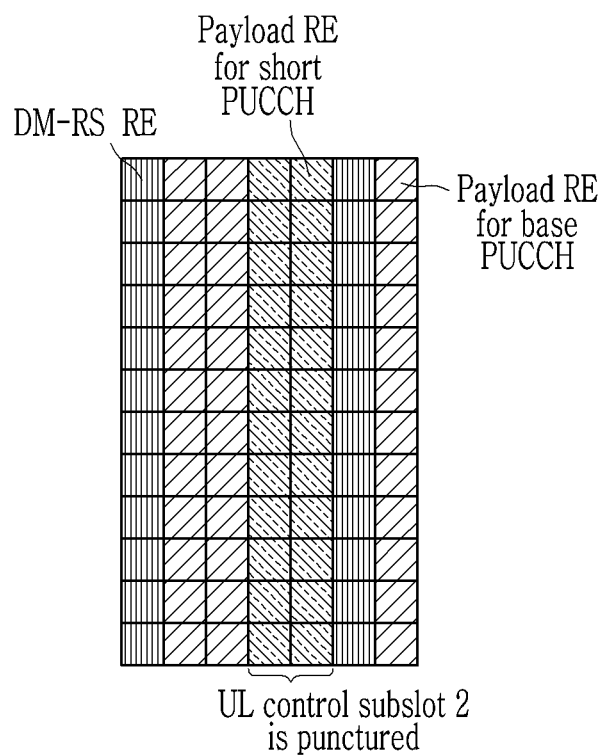

FIG. 16A and FIG. 16B are views showing a case that a base PUCCH is punctured through one short PUCCH according to an exemplary embodiment of the present invention. In detail, FIG. 16A illustrates a case that the UL control subslot1 is punctured, and FIG. 16B illustrates a case that the UL control subslot2 is punctured.

As illustrated in FIG. 16A, when the UL control subslot1 is punctured, two time domain symbols except for the DM-RS symbol among three time domain symbols belonging to the UL control subslot1 are punctured through the short PUCCH.

As illustrated in FIG. 16B, when the UL control subslot2 is punctured, two time domain symbols (including the DM-RS symbol) belonging to the UL control subslot2 are punctured through the short PUCCH.

Figure 17A:
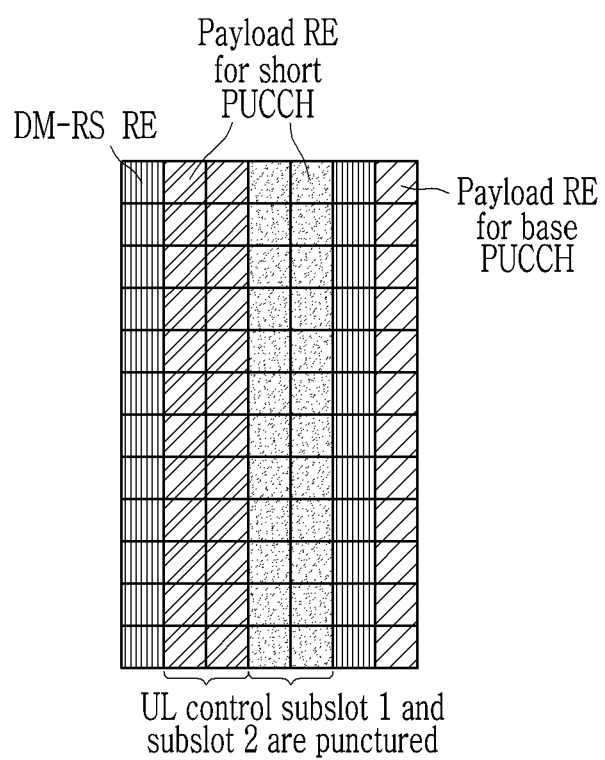
FIG. 17A and FIG. 17B are views showing a case that a base PUCCH is punctured through two or more short PUCCHs according to an exemplary embodiment of the present invention.
Figure 17B:
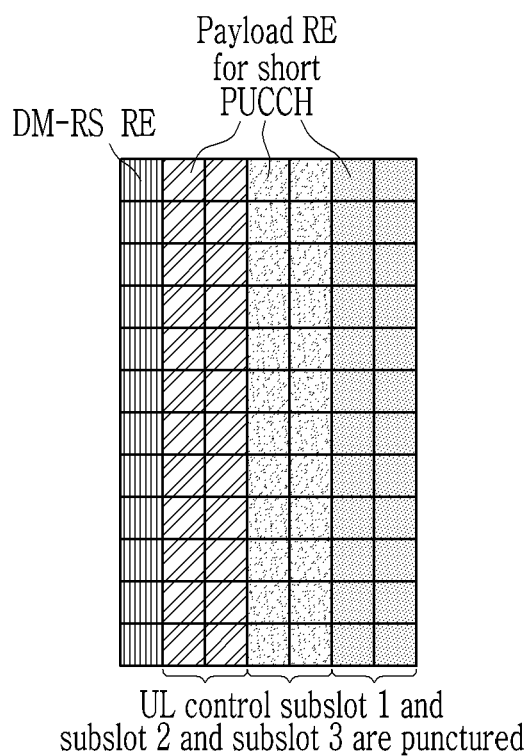

FIG. 17A and FIG. 17B are views showing a case that a base PUCCH is punctured through two or more short PUCCHs according to an exemplary embodiment of the present invention. In detail, FIG. 17A illustrates a case that two UL control subslots are punctured, and FIG. 17B illustrates a case that three UL control subslots are punctured.

FIG. 17A illustrates a case that the UL control subslot1 and the UL control subslot2 are punctured through the short PUCCH among cases where the base PUCCH is punctured through two short PUCCHs. In this case, the DM-RS symbol index corresponds to a first symbol and a second from the last symbol among seven UL symbols belonging to the UL slot. The base PUCCH is transmitted only in the last symbol among seven UL symbols belonging to the UL slot.

FIG. 17B illustrates a case that the base PUCCH is punctured through three short PUCCHs. That is, the UL control subslot1, the UL control subslot2, and the UL control subslot3 are punctured through the short PUCCH. The DM-RS symbol is positioned at the first symbol among seven UL symbols belonging to the UL slot. In this case, the short PUCCH occupies twelve subcarriers and two time domain symbols that correspond to 24 REs in total. By using the arbitrary sequence having the length of 24, the short PUCCH may be defined. The UE multiples the sequence and the HARQ-ACK symbol to generate the short PUCCH and transmits it to the serving cell (or the serving cell eNB).

A method P530 for the method P500 is a method additionally defining the DM-RS.

The method P530 allocates a part among 24 REs for the DM-RS and allocates the rest for the payload of the HARQ-ACK symbol.

If the SC-FDMA is used to maintain a single carrier property in the short PUCCH, a method distinguishing the DM-RS symbol and the payload symbol may be used. Therefore, the first UL symbol belonging to the UL control subslot1 is allocated for the DM-RS, and resultantly the first and second time domain symbols among the time domain symbols belonging to the UL slot are allocated for the DM-RS. The second UL symbol belonging to the UL control subslot1 transmits the payload.

If this method is similarly applied to the UL control subslot2, the first time domain symbol belonging to the UL control subslot2 is allocated for the DM-RS, and the second UL symbol belonging to the UL control subslot2 transmits the payload.

If this method is similarly applied to the UL control subslot3, the first time domain symbol belonging to the UL control subslot3 is allocated for the DM-RS, and the second UL symbol belonging to the UL control subslot3 transmits the payload.

To reduce a PAPR (peak to average power ratio), the UE may additionally perform a DFT precoding in the UL symbol transmitting the payload.

A method P540 for the method P500 is a method in which the DM-RS is not individually defined.

To process two time domain symbols, two 12-length sequences may be used, and each sequence may be mapped symbol-by-symbol to each corresponding time domain symbol. Also, to process two time domain symbols, one 24-length sequence may be used. Even if the puncturing is performed, because at least one DM-RS symbol exists, the HARQ-ACK bit may be transmitted based on angle information of the sequence.

A method P541 for the method P540 is a method using the 24-length sequence.

The method P541 uses one sequence through 24 REs.

There is no DM-RS, because the serving cell (or the serving cell gNB or the serving cell eNB) may not perform the coherent detection, non-coherent sequence detection is performed.

The UE is configured to have four sequences and selects one sequence among the four sequences depending on the HARQ-ACK 2 bits. The length of the sequence is 24.

Figure 18A:
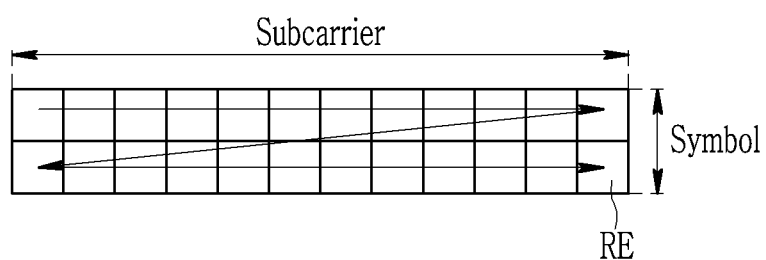
FIG. 18A and FIG. 18B are views showing an RE mapping method of a sequence according to an exemplary embodiment of the present invention.
Figure 18B:
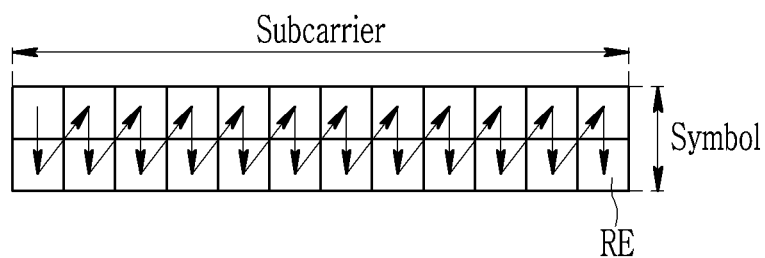

FIG. 18A and FIG. 18B are views showing an RE mapping method of a sequence according to an exemplary embodiment of the present invention. In detail, FIG. 18A illustrates subcarrier-first-symbol-second mapping, and FIG. 18B illustrates symbol-first-subcarrier-second mapping.

As illustrated in FIG. 18A, the UE may perform the frequency mapping earlier than the time mapping and then may perform the time mapping. Otherwise, as illustrated in FIG. 18B, the UE may perform the time mapping earlier than the frequency mapping and then may perform the frequency mapping.

On the other hand, because these REs are included in the same PRB (physical resource block), the same channel estimation is used, and because these REs are for one sequence, the serving cell (or the serving cell gNB or the serving cell eNB) may not detect the HARQ-ACK bit in advance before receiving all REs having the sequence. It is difficult to expect the performance gain at the serving cell (or the serving cell gNB or serving cell eNB) even if the UE permutates the sequence and the RE mapping by all means.

As a special example of this, in the RE mapping illustrated in FIG. 18A, a group of twelve REs may be mapped to one sequence, and two groups may be associated to the OCC. That is, the LTE system may use the 12-length sequence two times and may generate the 24-length sequence by using the time domain OCC.

The modified PUSCH is described as an example.

Figure 19:
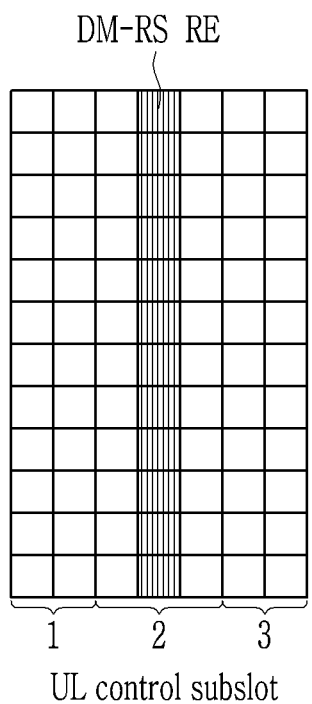
FIG. 19 is a view showing a UL control subslot structure using a PUSCH PRB according to an exemplary embodiment of the present invention.

FIG. 19 is a view showing a UL control subslot structure using a PUSCH PRB according to an exemplary embodiment of the present invention.

When the UL slot is configured of seven time domain symbols, one time domain symbol may be allocated for the DM-RS and the remaining six time domain symbols may configure three UL control subslots. In this case, because the DM-RS symbol may be positioned at the center (i.e., the 4th time domain symbol of the seven time domain symbols) of the UL slot and is not punctured, the multiplexing (for example, CDM (code division multiplexing)) with the PUSCH DM-RS may be considered. In FIG. 19, the UL control subslot1 and the UL control subslot3 include the two successive UL symbols, however the UL control subslot2 may include two UL symbols except for the DM-RS symbol among three symbols.

Figure 20:
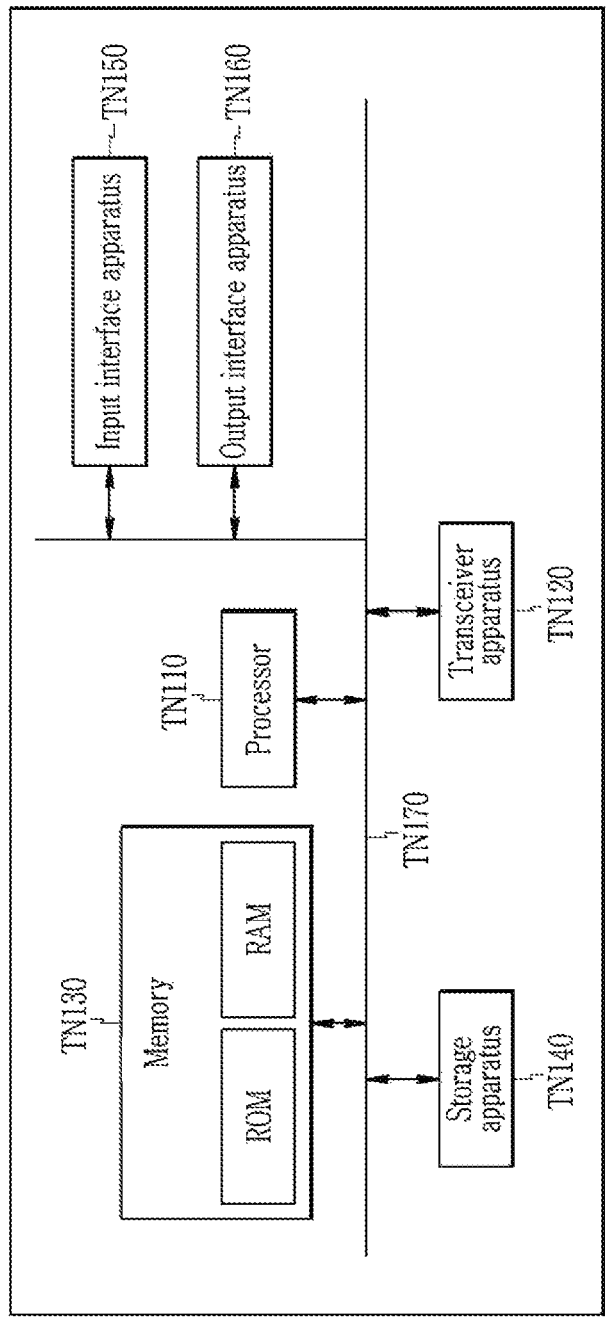
FIG. 20 is a view showing a computing apparatus according to an exemplary embodiment of the present invention.

FIG. 20 is a view showing a computing apparatus according to an exemplary embodiment of the present invention. A computing apparatus TN100 of FIG. 20 may be the UE, the serving cell, the eNB, and the gNB described in the present specification. Also, the computing apparatus TN100 of FIG. 20 may be a wireless apparatus, a communication node, a transmitter, or a receiver.

In the exemplary embodiment of FIG. 20, the computing apparatus TN100 may include at least one processor TN110, a transceiver apparatus TN120 connected to a network to perform communication, and a memory TN130. The computing apparatus TN100 may further include a storage apparatus TN140, an input interface apparatus TN150, an output interface apparatus TN160, etc. The constituent elements included in the computing apparatus TN100 are connected to each other by a bus TN170, thereby performing the communication.

The processor TN110 may perform a program command stored in at least one of the memory TN130 and the storing apparatus TN140. The processor TN110 may mean a central processing unit (CPU), a graphics processing unit (GPU), or a dedicated processor in which the methods according to an exemplary embodiment of the present invention are performed. The processor TN110 may be configured to realize the procedure, the function, and the methods described in relation to an exemplary embodiment of the present invention. The processor TN110 may control each of the constituent elements of the computing apparatus TN100.

Each of the memory TN130 and the storage apparatus TN140 may store various information related to the operation of the processor TN110. Each of the memory TN130 and the storage apparatus TN140 may be composed of at least one of a volatile storage medium and a non-volatile storage medium. As an example, the memory TN130 may be composed of at least one of a read-only memory (ROM) and a random access memory (RAM).

The transceiver apparatus TN120 may transmit and receive a wire signal or a wireless signal. Also, the computing apparatus TN100 may have a single antenna or a multi-antenna.

The exemplary embodiments of the present invention are not only embodied by the above-mentioned method and apparatus. Alternatively, the above-mentioned exemplary embodiments may be embodied by a program performing functions that correspond to the configuration of the exemplary embodiments of the present invention, or a recording medium on which the program is recorded. These embodiments can be easily devised from the description of the above-mentioned exemplary embodiments by those skilled in the art to which the present invention pertains.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

The invention claimed is:

1. A transmission method of uplink data by a first communication node, the transmission method comprising:
receiving a demodulation-reference signal (DM-RS) configuration for an uplink pilot time slot (UpPTS) of a special subframe from a second communication node;
transmitting the uplink data in the UpPTS when a number of time domain symbols belonging to the UpPTS is a predetermined number; and
transmitting a DM-RS for the uplink data transmitted in the UpPTS based on the DM-RS configuration,
wherein when the DM-RS for the uplink data is transmitted in the UpPTS based on the DM-RS configuration, the DM-RS is allocated to a fourth time domain symbol from a last time domain symbol among the time domain symbols belonging to the UpPTS.

2. The transmission method of claim 1, wherein the predetermined number is 6.

3. The transmission method of claim 1, wherein transmitting a DM-RS for the uplink data transmitted in the UpPTS based on the DM-RS configuration includes transmitting, in the UpPTS, no DM-RS for the uplink data when one time domain symbol is allocated for the uplink data transmitted in the UpPTS.

4. The transmission method of claim 3, further comprising transmitting, in a uplink subframe following the UpPTS, the DM-RS for the uplink data transmitted in the UpPTS when the one time domain symbol is allocated for the uplink data transmitted in the UpPTS.

5. The transmission method of claim 4, wherein:
the uplink subframe includes a first slot and a second slot following the first slot, and
an orthogonal cover code (OCC) or a cyclic shift for the DM-RS for the uplink data transmitted in the UpPTS is the same as an OCC or a cyclic shift for a DM-RS allocated to the second slot.

6. The transmission method of claim 1, wherein the same physical uplink shared channel (PUSCH) transmit power control (TPC) is applied to the UpPTS in the special subframe and the uplink subframe.

7. The transmission method of claim 1, further comprising receiving one UL grant for scheduling of an extended uplink subframe in which the UpPTS and the uplink subframe are aggregated from the second communication node,
   wherein the one UL grant is based on an index of the uplink subframe.

8. The transmission method of claim 1, further comprising transmitting a physical uplink shared channel (PUSCH) for a retransmission in an extended uplink subframe of which an index is (n+k) when receiving a physical hybrid automatic repeat and request indicator channel (PHICH) from the second communication node in a downlink subframe of which an index is n,
   wherein the UpPTS and the uplink subframe are aggregated in the extended uplink subframe, an index of the uplink subframe is (n+k), and an index of the special subframe is (n+k−1).

9. The transmission method of claim 1, further comprising:
   transmitting a physical uplink shared channel (PUSCH) to the second communication node in an extended UL subframe having an index of (n−k); and
   receiving a physical hybrid automatic repeat and request indicator channel (PHICH) for the PUSCH from the second communication node in a downlink subframe having an index of n,
   wherein the UpPTS and the uplink subframe are aggregated in the extended uplink subframe, an index of the uplink subframe is (n−k), and an index of the special subframe is (n−k−1).

* * * * *